(12) United States Patent
Iida et al.

(10) Patent No.: US 10,377,165 B2
(45) Date of Patent: Aug. 13, 2019

(54) IMAGE FORMING APPARATUS, METHOD FOR CONTROLLING IMAGE FORMING APPARATUS, AND NON-TRANSITORY COMPUTER-READABLE STORAGE MEDIUM IN WHICH PROGRAM IS RECORDED

(71) Applicant: CANON KABUSHIKI KAISHA, Tokyo (JP)

(72) Inventors: Toshihiko Iida, Toride (JP); Yoshiji Kanamoto, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/841,511

(22) Filed: Dec. 14, 2017

(65) Prior Publication Data
US 2018/0178576 A1   Jun. 28, 2018

(30) Foreign Application Priority Data

Dec. 28, 2016   (JP) ................... 2016-255963

(51) Int. Cl.
   *B42B 5/08* (2006.01)
   *B42C 19/02* (2006.01)
   (Continued)

(52) U.S. Cl.
   CPC ............. *B42C 19/02* (2013.01); *B42B 5/123* (2013.01); *B42C 1/10* (2013.01); *B42C 1/12* (2013.01);
   (Continued)

(58) Field of Classification Search
   CPC .. B42C 1/12; B42C 19/08; B42B 5/08; B42B 5/123; B42B 5/12; B26F 1/02; B65H 31/24; B65H 37/04; B65H 43/06; B65H 2801/27
   (Continued)

(56) References Cited

U.S. PATENT DOCUMENTS

| | | | | |
|---|---|---|---|---|
| 7,281,707 B2* | 10/2007 | Moriyama | ................ | B42C 1/12 270/58.04 |
| 7,497,427 B2* | 3/2009 | Ogushi | .................... | B42C 1/12 270/37 |

(Continued)

FOREIGN PATENT DOCUMENTS

JP   2012-006290 A   1/2012

OTHER PUBLICATIONS

U.S. Appl. No. 15/686,233, filed Aug. 25, 2017 (First Named Inventor: Toshihiko Iida).

(Continued)

*Primary Examiner* — Leslie A Nicholson, III
(74) *Attorney, Agent, or Firm* — Venable LLP

(57) ABSTRACT

An image forming apparatus includes: a first apparatus configured to perform punching on a sheet by using a punching member; a second apparatus, including a stacking part on which a plurality of sheets punched by the first apparatus is stacked, and configured to perform binding so as to obtain a bookbinding article in which a binding member penetrates in a ring shape through punched holes of the plurality of sheets; a notification unit notifying information; and a control unit configured, in a case of starting a job using the first apparatus and the second apparatus and determining that a jam has occurred in the stacking part, to cancel the job, and to cause the notification unit to notify that a thickness of a sheet stack stacked on the stacking part exceeds a thickness that enables to be bound by the binding member used by the second apparatus.

17 Claims, 18 Drawing Sheets

(51) Int. Cl.

| | |
|---|---|
| *B42C 1/12* | (2006.01) |
| *B42B 5/12* | (2006.01) |
| *B65H 43/06* | (2006.01) |
| *B65H 31/24* | (2006.01) |
| *B65H 37/04* | (2006.01) |
| *B42C 1/10* | (2006.01) |
| *G03G 15/00* | (2006.01) |
| *B65H 43/02* | (2006.01) |
| *B65H 43/04* | (2006.01) |
| *G06F 3/12* | (2006.01) |
| *B65H 35/10* | (2006.01) |

(52) U.S. Cl.
CPC ............ *B65H 31/24* (2013.01); *B65H 37/04* (2013.01); *B65H 43/02* (2013.01); *B65H 43/04* (2013.01); *B65H 43/06* (2013.01); *G03G 15/6538* (2013.01); *G06F 3/121* (2013.01); *G06F 3/1234* (2013.01); *G06F 3/1255* (2013.01); *G06F 3/1282* (2013.01); *B65H 35/10* (2013.01); *B65H 2511/13* (2013.01); *B65H 2511/528* (2013.01); *B65H 2801/27* (2013.01); *B65H 2801/48* (2013.01); *G03G 2215/00936* (2013.01)

(58) Field of Classification Search
USPC .................. 270/58.09; 412/11, 12, 38, 42
See application file for complete search history.

(56) References Cited

U.S. PATENT DOCUMENTS

| | | | | |
|---|---|---|---|---|
| 7,862,024 | B2* | 1/2011 | Taguchi | B65H 43/06 |
| | | | | 270/32 |
| 9,359,166 | B2* | 6/2016 | Takahashi | B65H 43/06 |
| 9,713,933 | B2* | 7/2017 | Umeda | B42C 1/125 |
| 2012/0063867 | A1 | 3/2012 | Kanamoto | |
| 2015/0014913 | A1* | 1/2015 | Obuchi | B65H 31/36 |
| | | | | 270/58.12 |

OTHER PUBLICATIONS

U.S. Appl. No. 15/793,072, filed Oct. 25, 2017 (First Named Inventor: Yoshiji Kanamoto).

* cited by examiner

FIG. 8A

< BOOKBINDING >
SETTING OF BOOKBINDING COPY

IMPOSITION METHOD

801 — PERFORM BOOKBINDING IMPOSITION | 802 PERFORM WIRE BOOKBINDING IMPOSITION | 803 PERFORM NO BOOKBINDING IMPOSITION

FINISHING METHOD

804 — FOLDING + SADDLE STITCHING | 805 FOLDING ONLY | 806 WIRE BINDING | 807 NO FINISHING

☐ ATTACH TOP COVER 808  ☐ OPENING DIRECTION 809  ☐ PAPER SETTING 810

✕ CANCEL SETTING — 811    812 — OK

FIG. 8B

< SETTING OF PAPER: TYPE OF PAPER >
SELECT TYPE OF PAPER

821 THIN PAPER | 822 PLAIN PAPER | 823 THICK PAPER

824 RECYCLED PAPER | 825 COLOR PAPER | 826 INDEX PAPER

827 PUNCHED PAPER

✕ CANCEL SETTING — 828    829 — NEXT

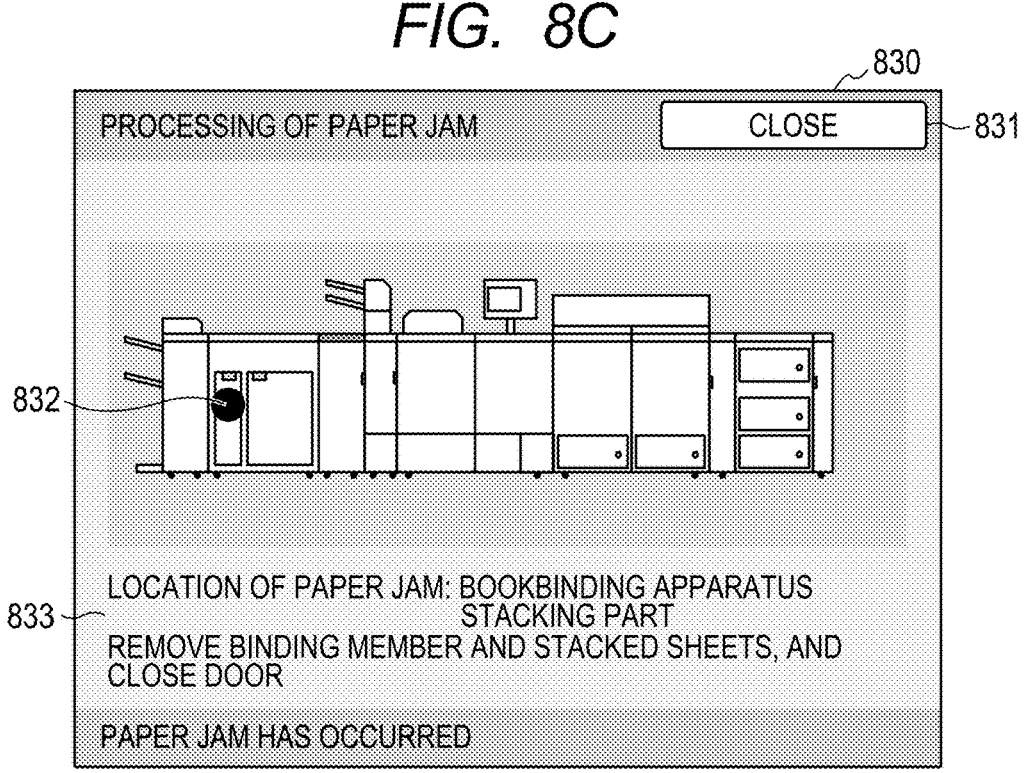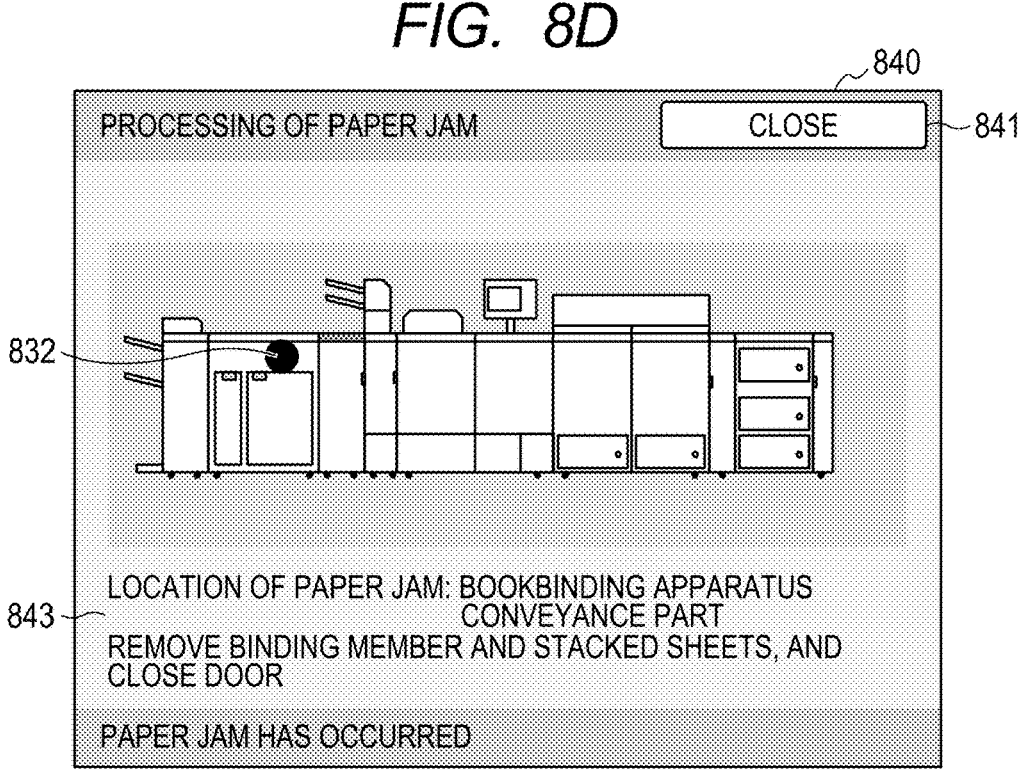

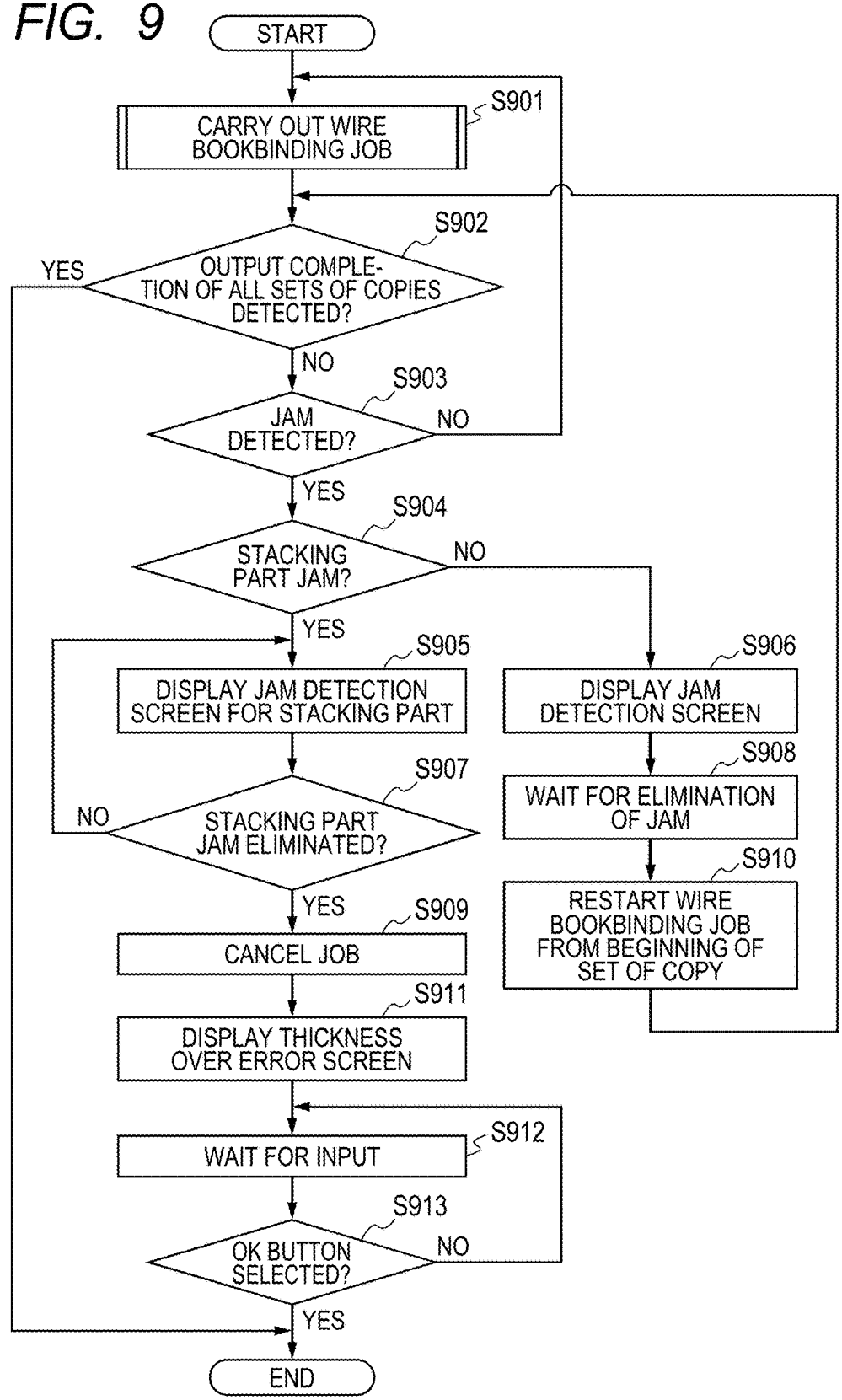

| FIG.11A |
| FIG.11B |

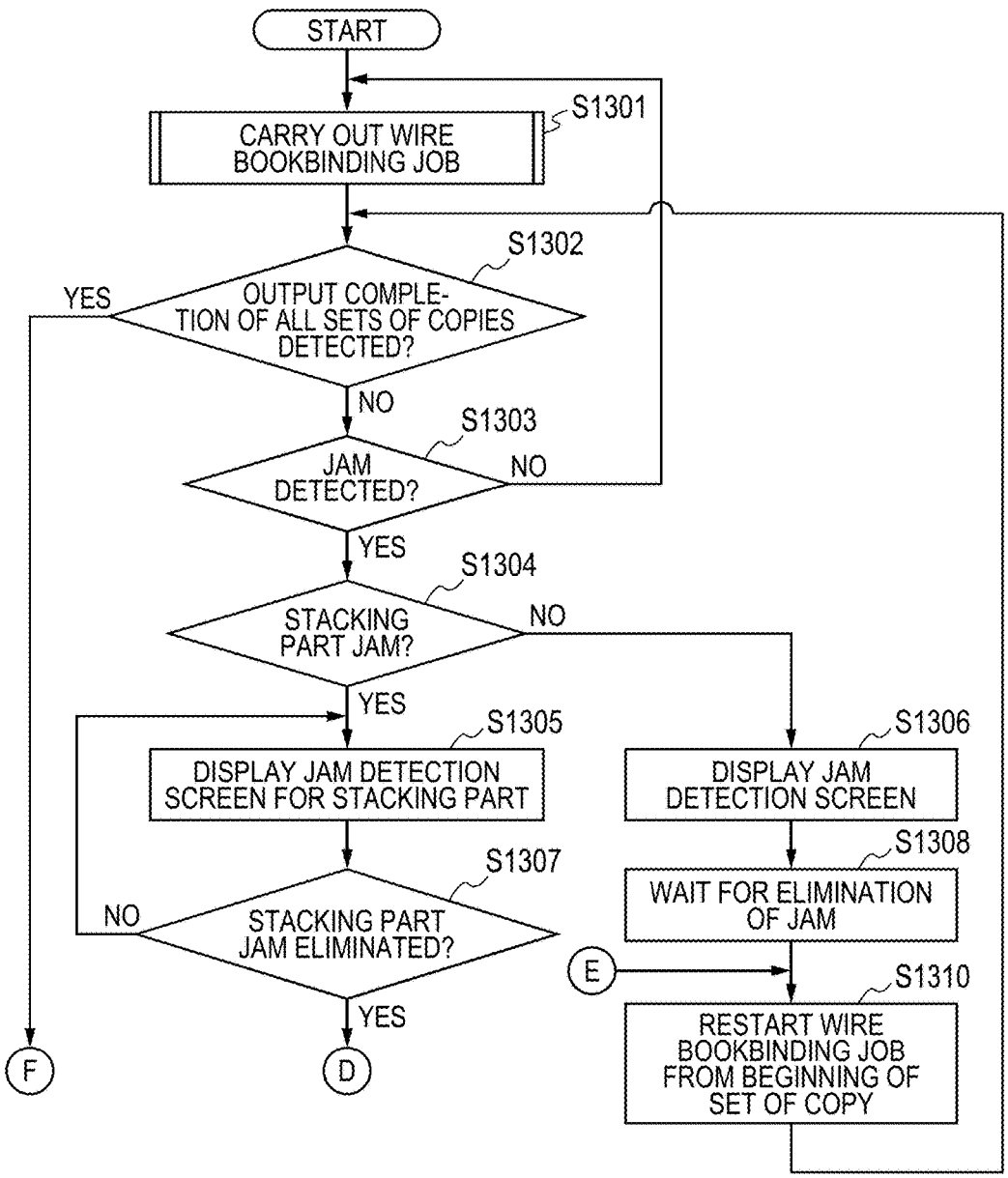

IMAGE FORMING APPARATUS, METHOD FOR CONTROLLING IMAGE FORMING APPARATUS, AND NON-TRANSITORY COMPUTER-READABLE STORAGE MEDIUM IN WHICH PROGRAM IS RECORDED

BACKGROUND OF THE INVENTION

Field of the Invention

The present invention relates to an image forming apparatus that executes a print job involving binding with use of punched portions of punched sheets, a method for controlling the image forming apparatus and a non-transitory computer-readable storage medium in which a program is recorded.

Description of the Related Art

Conventionally, as a post-process function executable by an image forming apparatus, there has been known a bookbinding function which can create a bookbinding resultant article by aligning a plurality of papers that is subjected to print and subjected to bind or apply gluing processing. As an example, there is cited a saddle bookbinding function of binding a central portion of a paper stack in an aligned state by pieces of wire (staples), and performing folding processing along the pieces of wire. As another example, there is cited a case bookbinding function of obtaining a bookbinding resultant article by applying gluing processing to paper end portions in an aligned state. As still another example, there is cited a process of obtaining a bookbinding resultant article by punching end portions of papers, and binding the papers by inserting a ring-shaped binding member into the spots punched by the punching. The process is called a wire bookbinding function or a ring bookbinding function, based on a shape of the binding member for use in binding.

As a binding method for the ring bookbinding function, there is known a method for obtaining a bookbinding resultant article by inserting a binding member into hole portions of a paper stack after punching processing. The binding member is formed of plastics in a predetermined size. As a method for binding by the wire bookbinding function, there is known wire bookbinding processing that is performed by inserting a binding member into hole portions of a paper stack to which punching processing is performed, and performing bending processing. The binding member is formed of a metal material that is cut into an arbitrary length. These functions are common in process steps although the binding members that are used are different, and therefore the functions will be collectively called a wire bookbinding function hereinafter.

In the wire bookbinding function, it greatly affects the appearance and usability of the resultant article that the thickness of the paper stack matches the size of the binding member. If the paper stack is too thin with respect to the binding member, the fixation becomes loose, and an ill-shaped resultant article is obtained. On the other hand, if the paper stack is too thick with respect to the binding member, the paper stack cannot be bound. For this problem, the maximum number of papers that can be bound is determined in advance, but the thickness of actual papers varies depending on the type, and the thickness also changes in accordance with humidity. In the method in which the maximum number of papers is set in advance, it is necessary to give room for the thickness, and the number of papers that can be bound decreases. In Japanese Patent Application Laid-Open No. 2012-6290, in order to select a binding member of a suitable size, the size of the binding member to be used is determined from the thickness of a paper stack that is calculated based on the information of the paper, and the thickness of the paper stack that is actually measured. In this method, the mechanism that accurately measures the thickness of a paper stack is required, and the apparatus becomes large-scale. A basis weight of paper is used to calculate the thickness from the paper information. However, it is difficult to calculate the thickness accurately from the basis weight, and the thickness of paper to which processing of making an uneven pattern on the surface such as embossing processing and wrinkle processing, for example is applied, cannot be calculated simply from the basis weight.

In the wire bookbinding function, it is important that the combination of the size of the binding member and the paper stack is appropriate. In particular, when the paper stack is too thick, a resultant article cannot be produced.

On the other hand, if the maximum number of papers to be bound is determined in advance, the paper stack which can be actually bound is sometimes determined as the paper stack that cannot be bound.

Further, even when the combination of the size of the binding member and the paper stack is in an appropriate state, when the image forming apparatus detects jam, the image forming apparatus does not notify a user how to eliminate the jam and a recovery operation plainly in the wire bookbinding function.

Consequently, the user who starts a job using the wire bookbinding function performs the same jam releasing process again and again, and spends a considerable time before obtaining the final resultant article.

SUMMARY OF THE INVENTION

The present invention is made to solve the above described problem. An object of the present invention is to provide a mechanism that can prevent occurrence of same jam due to a binding member after elimination of jam, when a wire bookbinding job using the binding member is started and the jam is detected.

An image forming apparatus of the present invention that achieves the above described object includes: a first apparatus configured to perform punching on a sheet by using a punching member; a second apparatus, including a stacking part on which a plurality of sheets punched by the first apparatus is stacked, and configured to perform binding so as to obtain a bookbinding article in which a binding member penetrates in a ring shape through punched holes of the plurality of sheets; a notification unit notifying information; and a control unit configured, in a case of starting a job using the first apparatus and the second apparatus and determining that a jam has occurred in the stacking part, to cancel the job, and to cause the notification unit to notify that a thickness of a sheet stack stacked on the stacking part exceeds a thickness that enables to be bound by the binding member used by the second apparatus.

According to the present invention, when a wire bookbinding job using a binding member is started, and a jam is detected, a same jam due to the binding member can be prevented from occurring after the jam is eliminated.

Further features of the present invention will become apparent from the following description of exemplary embodiments with reference to the attached drawings.

BRIEF DESCRIPTION OF THE DRAWINGS

FIGS. 8A, 8B, 8C, 8D and 8E are UI screens that are displayed on an operation panel.

FIG. 9 is a flowchart describing a method for controlling an image forming apparatus.

DESCRIPTION OF THE EMBODIMENTS

Embodiments of the present invention will now be described in detail in accordance with the accompanying drawings.

<Explanation of System Configuration>

First Embodiment

Figure 1:
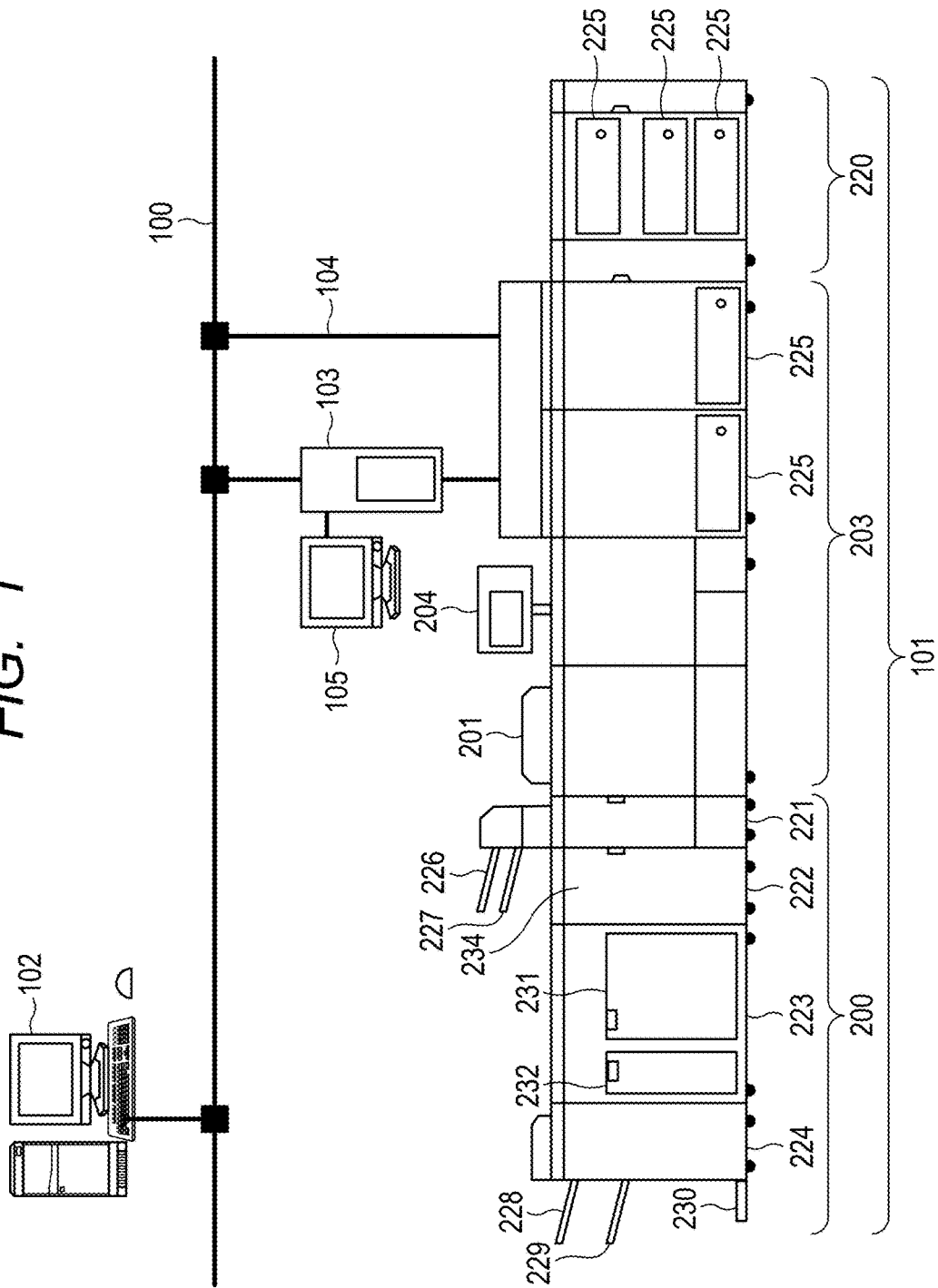
FIG. 1 is a diagram describing a configuration of a printing system.

FIG. 1 is a configuration diagram illustrating a configuration of an image forming system having a sheet postprocessing device illustrating the present embodiment. In the present embodiment, an MFP (Multifunction Peripheral) 101 is described as an example of an image forming apparatus, and a PC 102 is described as an example of a host apparatus that generates a print job. The MFP 101 and the PC 102 are connected communicably via a network 100. A PC 103 is an information processing apparatus, which receives a print job from the network 100 and transmits the print job to the MFP 101. In the present embodiment, a case of configuring the image forming apparatus as one MFP is shown, but an image forming apparatus also can be configured as a printing system where the respective apparatuses communicate. As the printing system, a plurality of MFPs 101 and a plurality of host apparatuses may be connected communicably via the network 100. As the printing system of the present embodiment, a case including the image forming apparatus and the host apparatus is illustrated, but the printing system is not limited to this. For example, the image forming apparatus may be a print processing system. Furthermore, in image forming that can be executed by the MFP 101 for itself, for example, in execution of a copy job, the apparatuses that are connected to the network 100 may be made unnecessary. In the following explanation, the print job includes a copy job that prints an image of an original that is read, and a print job that prints information transmitted from a computer.

First, the PC 102 will be described. The PC 102 can execute various programs such as an application program for inputting a print job. Further, in the PC 102, a printer driver having a function of converting print data into printer language corresponding to the MFP 101 is installed. A user who desires to perform print can issue a print instruction from various applications. The printer driver converts data which the application outputs based on the print instruction into print data that can be interpreted by the MFP 101. The printer driver can transmit the print data to the MFP 101 connected to the network 100.

In the present embodiment, the PC is illustrated as an example of the host apparatus, but the host apparatus may be, for example, a personal digital assistant such as a smartphone or a tablet terminal. A method for transmitting the print data to the image forming apparatus can be properly modified. The print data may be transmitted to the image forming apparatus via an application for printing or a driver. Further, the print data may be transmitted to the image forming apparatus via a cloud server.

Next, the MFP 101 which is the image forming apparatus will be described.

The MFP 101 has a reading function of reading an image of an original, and a print function of printing an image onto a sheet. Further, the MFP 101 has a postprocessing function of binding a plurality of sheets on which images are printed, aligning a plurality of sheets, and dividing a discharge destination of a plurality of sheets into a plurality of trays. The sheets include a paper such as a plain paper or a thick paper, and a film.

In the present embodiment, the MFP 101 is described as an example of the image forming apparatus. However, the image forming apparatus may be a printer that does not have a reading function, for example. In the present embodiment, the image forming apparatus includes various components that will be described as follows as an example.

The apparatus 103 having part of the function of the MFP 101 or other subsidiary functions may be added to the MFP. In this case, from the PC 102, it can be regarded that the apparatus 103 provides the function of the MFP 101, via the network 100. Various input/output apparatuses similar to those included by the PC 102, such as a monitor 105, for example, can be attached to the apparatus 103. In the case of the accompanying apparatus 103 being connected, the MFP 101 may be directly connectable to the network 100 by using a network cable 104.

Respective parts configuring the MFP 101 will be described.

A printer part 203 forms (prints) an image onto a sheet fed from a sheet feeding unit by using toner based on image data. A configuration and an operating principle of the printer part 203 are as follows. Light beams such as laser light, for example, that are modulated in accordance with image data are reflected by a rotary polygonal mirror (polygon mirror) and irradiated to a photosensitive drum as scanning light. An electrostatic latent image formed on the photosensitive drum by the laser light is developed by the toner, and the toner image is transferred to a sheet stuck to a transfer drum. The series of image forming processes is sequentially executed to toners of yellow (Y), magenta (M), cyan (C) and black (K), and thereby a full color image is formed on the sheet. In addition to these four colors, a toner called a spot color, or a transparent toner may be made transferrable. The sheet on the transfer drum, on which the full color image is formed is conveyed to a fixing device. The fixing device includes a roller and a belt, contains a heat source such as a halogen heater in the roller, and the tonner on the sheet on which the toner image is transferred is fixed to the sheet by heat and pressure.

To the printer part 203 of the MFP 101 in the present embodiment, a scanner 201 that is an image reading apparatus, and an operation panel 204 that is disposed on an upper portion of the printer part 203 are connected. The operation panel 204 provides various interfaces in a case of a user performing various settings and operations of the printer part 203 according to the first embodiment. Further, to the MFP 101, various accompanying apparatuses are fittable, in addition to the printer part 203. In the present embodiment, the operation panel 204 (notification unit) issues information of a jam that has occurred in a stack job and information for avoiding jam by using various UI screens.

A large capacity paper feeding apparatus 220 is a paper feeding apparatus attachable to and detachable from the printer part 203. The paper feeding apparatus includes a plurality of sheet feeding parts 225. Thereby, the printer part 203 can perform a printing process to the sheets in large volume.

The sheet feeding parts 225 are also present inside the printer part 203, and can functionally execute a same thing as the paper feeding apparatus 220 which is the paper feed system apparatus. These sheet feeding parts 225 which are included by the printer part 203 will be also called the paper feed system apparatus in explanation.

An inserter 221 feeds a sheet for insertion with respect to sheets created by the printer part 203 without passing through the printer part 203 so that a resultant article in which the sheet for insertion is inserted in a sheet stack after printing is obtained. FIG. 1 illustrates the apparatus including two trays 226 and 227.

A punching apparatus 222 (a first apparatus) performs processing such as punching processing to the sheets fed by the printer part 203 or the inserter 221. A punching tool 501 called a die inside the punching apparatus 222 of the present example is replaceable. Consequently, the punching apparatus 222 includes a door 234 for replacing the die. Details of the punching apparatus 222 will be described later.

A bookbinding apparatus 223 (a second apparatus) is included to carry out bookbinding characteristic in the present embodiment. Specifically, the bookbinding apparatus 223 stacks the punched sheets which are subjected to process by the punching apparatus 222 in such a manner that hole portions (punched holes) of the sheets are mounted onto protrusions of a binding member which is fixed. The bookbinding apparatus 223 deforms (bends into a ring shape) the binding member, whereby a sheet stack, that is, a bookbinding resultant article is obtained.

The created bookbinding resultant article is stacked on a tray that is disposed inside and is accessed by a bookbinding door 231. The bookbinding apparatus 223 also includes a door 232 that is openable and closable when replenishment of the binding members is performed. Further, the bookbinding apparatus 223 also includes a door 233 that is used when an access is made to a sheet conveying path inside the bookbinding apparatus 223, when a jam has occurred in the bookbinding apparatus 223, for example. Details of the bookbinding apparatus 223 will be described later.

A finisher 224 is provided to apply needle binding processing to a plurality of sheet stacks. As kinds of needle binding which the finisher 224 enables, there are modes of binding that are desired by an operator such as corner binding, two-points binding and saddle bookbinding. Processed resultant articles are discharged onto trays 228 and 229 in the case of corner binding or two-points binding, and are discharged onto a tray 230 in the case of saddle bookbinding.

The inserter 221, the punching apparatus 222, the bookbinding apparatus 223 and the finisher 224 are called sheet processing device 200 of a postprocessing system.

<Description of Image Forming Apparatus>

Figure 2:
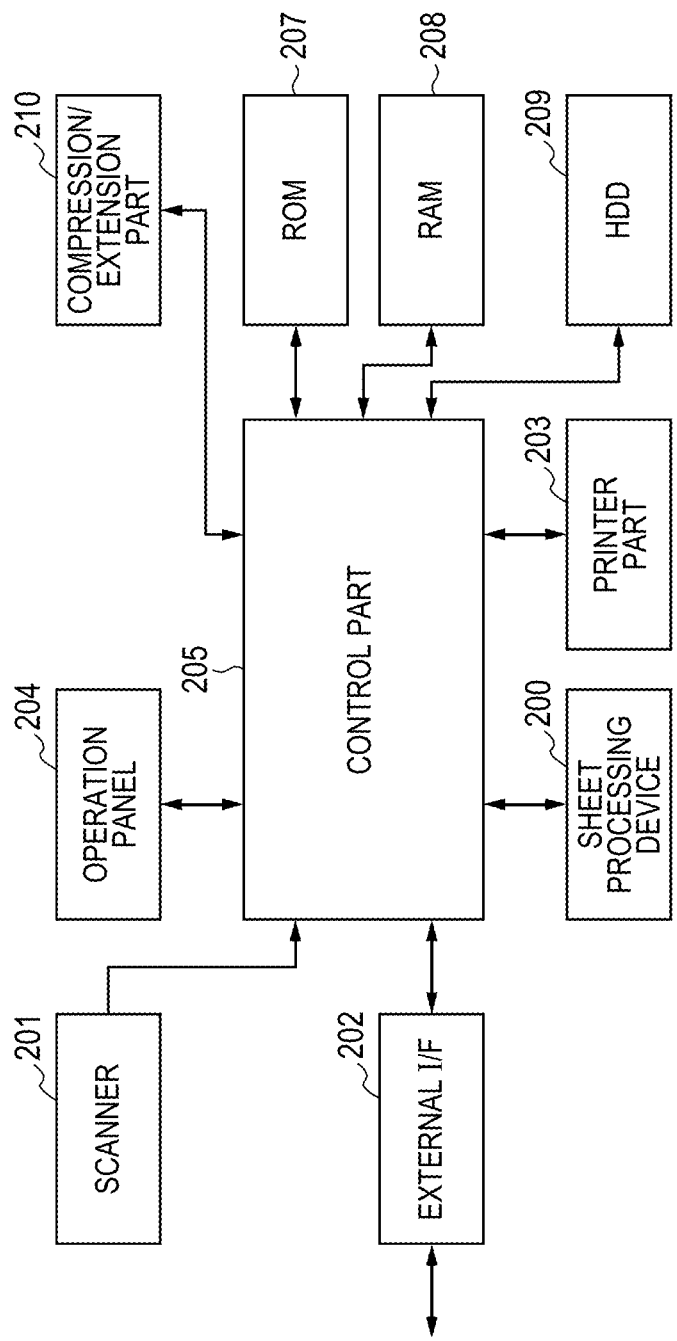
FIG. 2 is a block diagram illustrating a hardware configuration of an MFP.

FIG. 2 is a block diagram describing a configuration of the MFP 101 illustrated in FIG. 1. In FIG. 2, the configuration is divided into units as a system, and therefore some parts do not necessarily correspond to the units of the apparatus configuration illustrated in FIG. 1.

In FIG. 2, the MFP 101 includes a nonvolatile memory such as a hard disk 209 (hereinafter, HDD) that is capable of storing data of jobs to be a plurality of processing targets, inside the own apparatus. In the first embodiment, an example of the MFP 101 using the hard disk is shown, but the nonvolatile memory is not limited to a hard disk, if it is a similar large-capacity and nonvolatile storage apparatus.

The MFP 101 has a copy function of storing data accepted from a scanner 201 into the HDD 209, reading the data from the HDD 209 and printing the data in a printer part 203. Further, the MFP 101 has a print function of storing job data received via an external I/F part (unit) 202 that is an example of a communication part, from an external apparatus, into the HDD 209, and reading the job data from the HDD 209 and printing in the printer part 203. The MFP 101 is a multifunctional processing apparatus (also referred to as an image forming apparatus) including a plurality of functions like them. The MFP 101 may enable either color print or monochrome print. The scanner 201 reads an original image, and performs image processing of image data obtained by reading the original and outputs the image data.

The external I/F 202 transmits and receives image data to and from a facsimile, network connection equipment or an external dedicated apparatus. Various kinds of management information that are permanently stored, changed and managed by the MFP 101 are also stored in the HDD 209. The MFP 101 includes the printer part 203 that executes a print process of data of a job of a print target that is stored in the HDD 209. The MFP 101 also includes an operation panel 204 having a display unit corresponding to an example of a user interface unit.

A control part 205 as an example of a control unit included by the MFP 101 has a CPU (not illustrated), and generally controls processing and operations of various units included by the MFP 101. Various control programs necessary in the first embodiment, including programs for executing various processes of flowcharts executed by the control part 205 are stored in a ROM 207. Moreover, a display control program for causing a display unit of the operation panel 204 to display various user interface screens (hereinafter, UI screens) is also stored in the ROM 207.

The CPU of the control part 205 reads and executes the programs stored in the ROM 207, whereby various operations according to the present embodiment are executed by the MFP 101. A program for the control part 205 to interpret page description language (hereinafter, abbreviated as PDL) data received from an external apparatus via the external I/F 202 and execute an operation of expanding the data to raster image data (bit map image data) is also stored in the ROM 207.

Similarly, a program for the control part 205 to interpret and process a print job received from an external apparatus via the external I/F 202 is also stored in the ROM 207. These programs are processed by software.

The ROM 207 is a read only memory, and stores various programs in advance, such as programs of a boot sequence, font information and the like, and the above described programs. Details of the various programs stored in the ROM 207 will be described later. The RAM 208 is a memory that is readable and writable, and stores image data sent from the scanner 201 or the external I/F 202, various programs and set information.

The control part 205 stores job data to be a processing target that is input via various input units such as the scanner 201 and the external I/F 202 into the HDD 209, reads the job data from the HDD 209, outputs the job data to the printer part 203 to print.

Further, the control part 205 also controls so that the job data read from the HDD 209 is transmittable to an external apparatus via the external I/F 202. In addition, the control part 205 also controls an operation of a sheet processing device 200.

<Explanation of Information Processing Apparatus>

Figure 3:
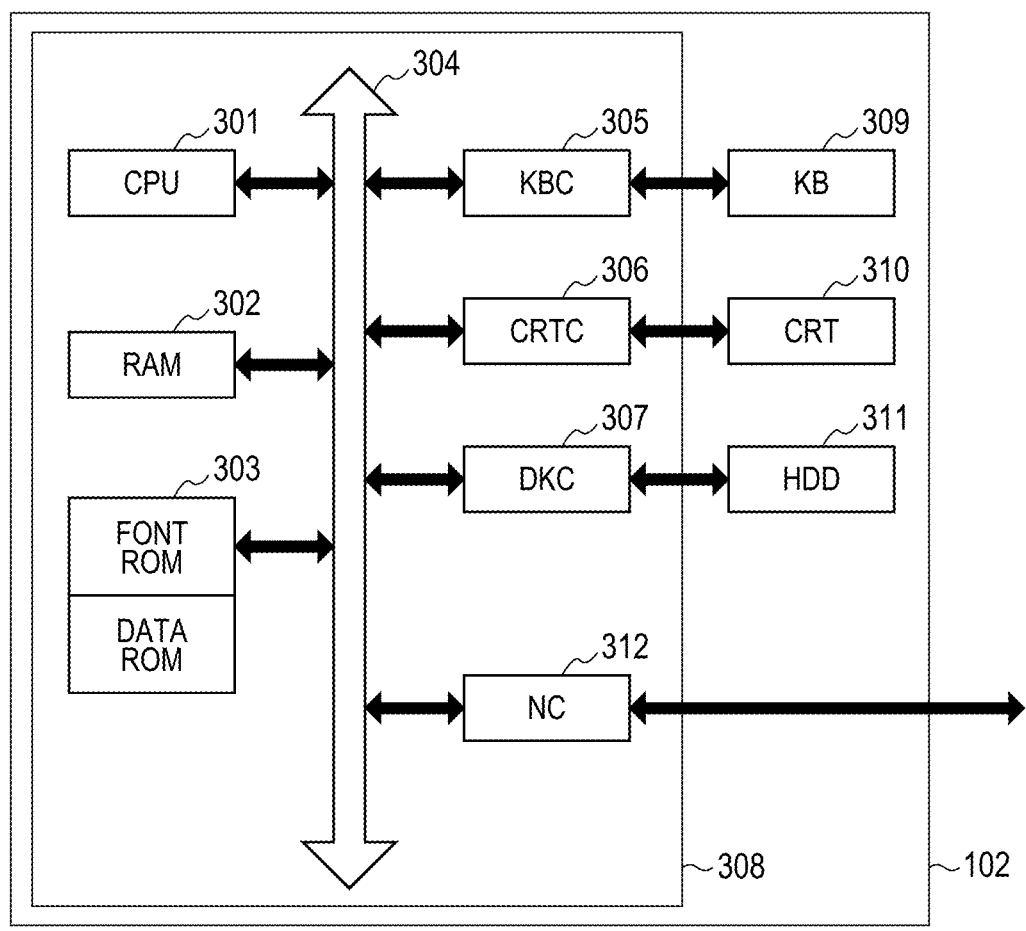
FIG. 3 is a block diagram describing a configuration of an information processing apparatus.

FIG. 3 is a block diagram illustrating a configuration of the computer (PC) 102 illustrated in FIG. 1. Hereinafter, a configuration of a host apparatus of the present embodiment will be described.

In FIG. 3, a CPU 301 executes programs such as an OS stored in a ROM for program in a ROM 303, or loaded in a RAM 302 from an HDD 311, a general application and a bookbinding application. The ROM 303 has a font ROM and a data ROM. The RAM 302 functions as a main memory and a work area of the CPU 301.

A keyboard controller (KBC) 305 controls inputs from a keyboard (KB) 309 and a pointing device (not illustrated). A display controller (CRTC) 306 controls display to a display unit (CRT) 310.

A disk controller (DKC) 307 controls access to the HDD 311 that stores a boot program, various applications, font data and user files. A network controller (NC) 312 is connected to the network 100 and executes communication control processing with other apparatuses connected to the network 100. A bus 304 connects the RAM 302, the ROM 303 and various controllers to the CPU 301, and transports data signals and control signals.

<Explanation of Bookbinding Apparatus>

Figure 4:
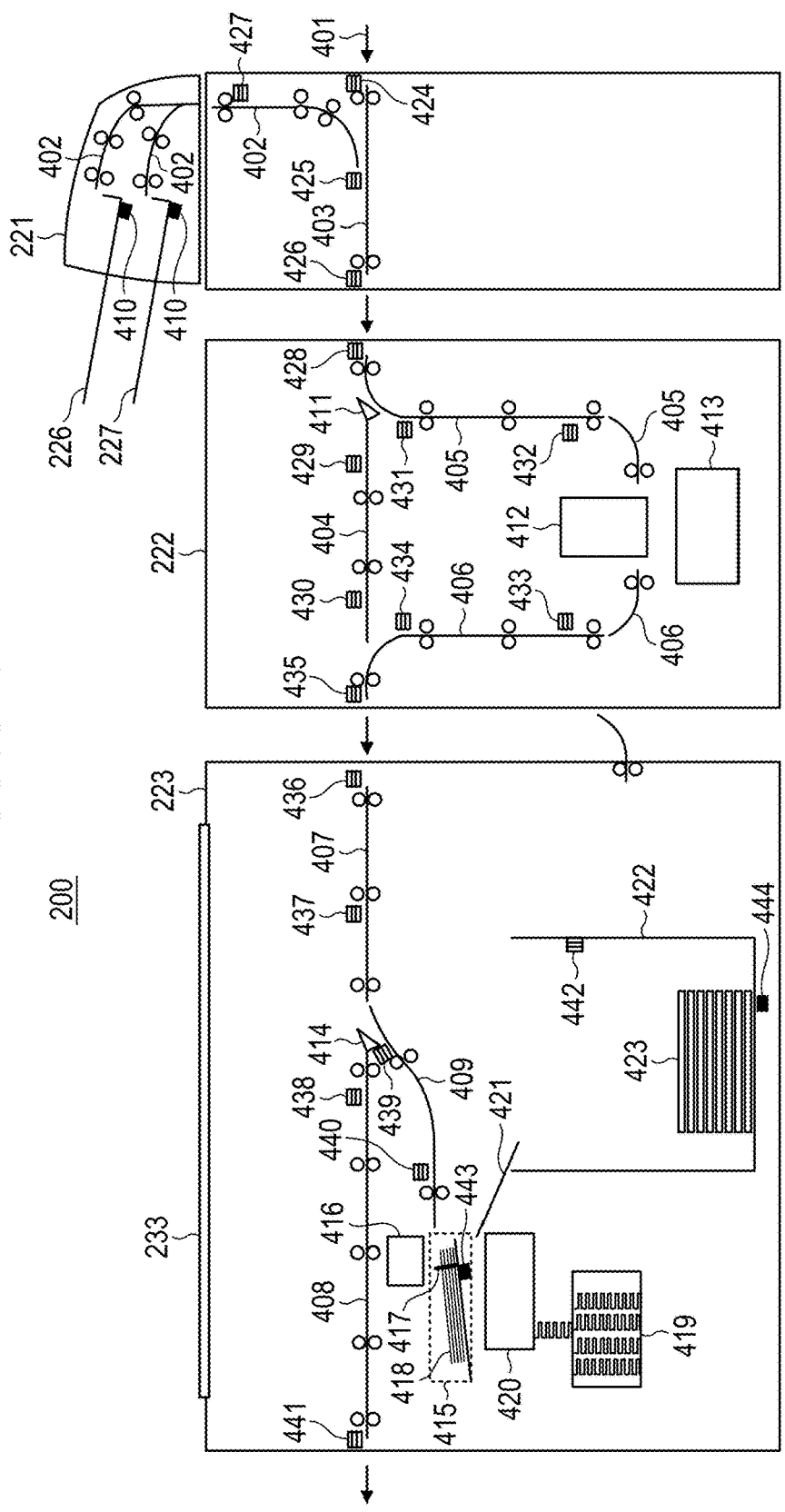
FIG. 4 is a diagram describing a configuration of a bookbinding apparatus and a sheet processing device.

FIG. 4 describes configurations of the bookbinding apparatus 223 and the sheet processing device 200 that is disposed in a vicinity of the bookbinding apparatus 223 illustrated in FIG. 1. Hereinafter, the inserter 221, the punching apparatus 222 and the bookbinding apparatus 223, and members relating to bookbinding and mechanisms thereof, among these apparatuses, will be described. Pairs of circular members illustrated in FIG. 4 show substantial dispositions of rollers for conveying sheets.

A sheet with an image formed, which is printed in the printer part 203, is conveyed to an apparatus in a subsequent stage, that is a conveying path 403 in the inserter 221 in the present embodiment, from a portions shown by an inserter carrying-in route 401. The inserter 221 can convey sheets to the conveying path 403 without passing through the printer part 203. Specifically, the inserter 221 can guide the sheets disposed on the trays 226 and 227 to the conveying path 403 via a conveying path 402. The trays 226 and 227 are equipped with sensors 410 for distinguishing whether or not paper is placed thereon. The paper passing through the conveying path 403 is guided into the punching apparatus 222 in a subsequent stage.

In the punching apparatus 222, paper is guided to different conveying paths in accordance with necessity and unnecessity of processing by the punching apparatus. That is, paper that does not need processing is guided into the bookbinding apparatus 223 in a subsequent stage via a conveying path 404. On the other hand, paper that needs processing by the punching apparatus 222 is guided to a processing part 412 via a conveying path 405. Switch of the conveying path with respect to a sheet is performed by a flapper 411 being controlled to be positioned so that the sheet is guided to a predetermined conveying path. In the processing part 412, sheet processing such as punching predetermined locations of the guided sheet is executed. A punching chip stacking part 413 is a stacking portion for punching chips. The sheets processed by the processing part 412 are guided into the bookbinding apparatus 223 in the subsequent stage via a conveying path 406. The processing part 412 and kinds of processes processed thereby will be described later.

The sheets guided into the bookbinding apparatus 223 via a conveying path 407 are guided to different conveying paths in accordance with necessity and unnecessity of bookbinding by the apparatus. Switch of the conveying path is performed by a flapper 414 being controlled to be positioned in a predetermined position so that a sheet is guided to a predetermined conveying path. That is, when bookbinding is not required, the sheet is discharged to an apparatus in a subsequent stage via a conveying path shown by a conveying path 408.

When bookbinding is required, the flapper 414 is controlled so that the sheet is guided to a conveying path 409. The sheet that is guided to the conveying path 409 is guided to a sheet stacking part 415. In FIG. 4, a binding member 417 and stacked sheets 418 are shown in the stacking part 415. In bookbinding according to the present embodiment, sheets are stacked one by one so that the binding member penetrates through punched portions of the sheets to which punching processing is applied by punching, or the sheets to which punching processing is applied in advance. Further, the binding member is deformed into a ring shape, whereby a bookbinding resultant article is obtained.

Accordingly, the sheets that are guided to the stacking part 415 via the conveying path 409 need to have been applied the punching of a predetermined form. Specifically, the sheets need to have been applied the punching so that the binding member can penetrate through hole portions of the sheets to which the punching has been applied. The binding member and punching properties of the punching will be described later.

The binding member is cut after the binding member is pulled out by a length that is necessary to process a sheet, from a holding unit 419 of the binding member. The bookbinding apparatus 223 has a binding member supply unit 420 for accurately disposing the binding member in a predetermined position of the stacking part 415.

When stacking of all the sheets requiring bookbinding processing is completed, a deforming process of the binding member 417 is performed by a processing part 416. The processing part 416 performs processing of deforming the binding member 417 by applying pressure and binding a paper stack. When sufficient deformation cannot be performed even if a certain amount of pressure is applied to the binding member 417, or when a stacking part sensor 443 detects stack of sheets continuously for a fixed time period or more after a final paper is stacked in the stacking part 415, the bookbinding apparatus 223 determines it as a jam in the stacking part 415 and issues notification to the control part 205. When a paper cannot be conveyed to the stacking part 415 because the stacking part 415 is filled with papers, remaining papers are detected by a sheet conveyance sensor 440 at a carrying-in port to the binding member processing part. In this case, a sheet stack remains in the stacking part 415, and the binding member 417 already placed and the paper stack already stacked also need to be removed, so that the bookbinding apparatus 223 detects this case as a jam in the stacking part 415. Hereinafter, a jam in the stacking part caused by thickness of the paper stack exceeding will be referred to as a stacking part jam. A bookbinding resultant article to which binding is applied is obtained by the bookbinding apparatus 223 and the result of the process. The created bookbinding resultant article is guided to a resultant article tray 422 via a conveying path 421. FIG. 4 illustrates a state where a created bookbinding resultant article 423 is stored in the resultant article tray 422.

The resultant article tray 422 is equipped with a resultant article tray sensor 444 and an upper limit sensor 442 for the resultant article tray stack. The resultant article tray sensor 444 detects whether a resultant article is placed on the resultant article tray 422. The upper limit sensor 442 for the resultant article tray stack detects an overflow of the resultant article tray 422.

Sheet conveyance sensors 424, 425, 426, 427, 428, 429, 430, 431, 432, 433, 434, 435, 436, 437, 438, 439, 440 and 441 detect presence or absence of sheets in the conveying paths, and reflection-type photo IC sensors are used. The reflection-type photo IC sensor includes a light emitting part that emits infrared light from an infrared light LED, and a light receiving part that receives reflected infrared light. When a sheet is conveyed on the conveying path, and passes under each of the sheet conveyance sensors, the infrared light emitted by the light emitting part is reflected on a surface of the sheet. The sheet conveyance sensor detects passage of the sheet by receiving the reflected light by the light receiving part. When reception of the reflected light continues for a fixed time period or more, the control part 205 determines that the sheet remains, and detects occurrence of a jam. The sheet conveyance sensor detects removal of jammed paper when reception of the reflected light stops after occurrence of the jam.

<Explanation of Punching Tool>

Figure 5:
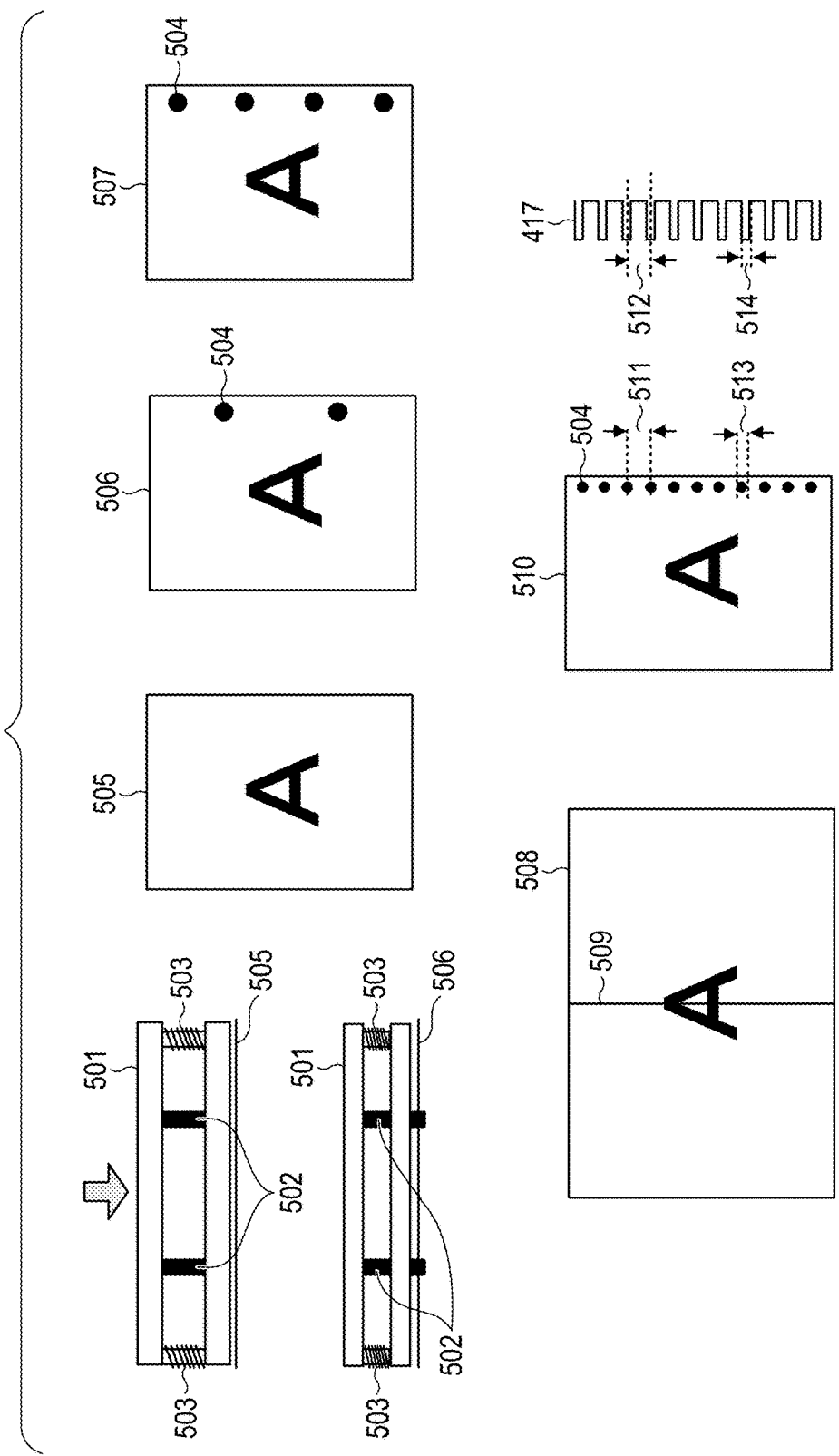
FIG. 5 is a view describing a punching processing in a punching apparatus.

FIG. 5 describes a work process that is applied to sheets by the processing part 412 in the punching apparatus 222 illustrated in FIG. 4.

In FIG. 5, a punching tool 501 called a die can be disposed in the processing part 412 to be replaceable. The punching tool 501 is a die of punching, and various kinds of punching are enabled by replacing the punching tool 501. Hereinafter, details of a work process such as punching a sheet, which is performed by the processing part 412 will be described.

The punching tool 501 is an example of the punching member. Each of the replaceable punching tools 501 includes punching properties such as a shape of a hole to be punched into a sheet, a space between holes, the number of holes and identification information. Here, the punching member needs to consist with the binding member 417 of the bookbinding apparatus 223. In the present embodiment, control of avoiding sheet postprocessing to be a mismatch is performed by determining whether the binding member 417 of the bookbinding apparatus 223 consists with the replaceable punching tool 501. Details of the control will be described by using a flowchart that will be described later.

A sheet 505 that is a processing target is a processing target of the punching, and is guided to the processing part 412 via the conveying path 405 in FIG. 4. Although punching portions 502 are firmly fixed by struts 503, the punching portions 502 are pushed out downward by applying pressure from above the punching tool 501. Tip ends of the punching portions 502 are formed to have sharp punching shapes to be suitable for punching. As a result, punching is performed to the sheet 505 disposed under the punching tool 501.

Various kinds of punching tools 501 are prepared in accordance with the punching properties, for example, the shape and the number of holes that are required, and are flexibly replaceable. For example, when a resultant article in which a shape of a hole is round and the number of holes is two as shown in a sheet 506 in which two holes are punched, the punching tool 501 in a corresponding shape is disposed in the processing part 412. In a case of obtaining a resultant article in which the shape of the hole is square, and the number of holes is four as shown in a sheet 507 in which four holes are punched, the punching tool 501 in the corresponding shape can be disposed in the processing part 412.

When the punching tool 501 is replaced, the bookbinding apparatus 223 notifies the control part 205 of change of the punching tool 501 through the external I/F 202. Alternatively, an operator operates the operation panel 204 after replacement and manually inputs the kind of punching tool 501 after replacement.

The punching apparatus 222 in the present embodiment also enables processing other than punching by a mechanism of the apparatus that applies processing to the sheet disposed under the punching tool 501 by applying pressure from above the punching tool 501. Specifically, the punching apparatus 222 also enables processing for applying a line for facilitating folding that is called a crease 509 to a center portion of a sheet as shown in a sheet 508 to which crease processing (creasing) has been applied.

Punching for realizing bookbinding will be described by using the drawing showing a sheet 510 which is processed by a bookbinding punching.

As described in FIG. 4, bookbinding in the present embodiment is on the precondition of a mechanism that causes the binding member 417 to penetrate through the sheet to which punching is applied in the bookbinding apparatus 223. Accordingly, the punching apparatus 222 enables punching according to each kind of shapes and the number of holes that are the punching properties. In spite of this, at the time of bookbinding, punching processing has to be done by the punching tool 501 suitable for bookbinding so that the die consists with the binding member 417.

Specifically, the number of holes punched in the sheet should consist with the binding member 417. This is because at the binding time, the process of causing the binding member 417 to penetrate through the hole portions (sheet holes) 504 of the sheet 510, and further deforming the binding member 417 is required.

Furthermore, a hole interval 511 and a binding member interval 512 need to coincide with each other, and unless a size 514 of a penetration portion of the binding member 417 is smaller than a size 513 of the hole, the binding member 417 cannot be caused to penetrate through the holes. These conditions are also derived from the mechanism of bookbinding that requires the process of causing the binding member 417 to penetrate through the hole portions 504, and deforming the binding member 417.

In this way, in the punching accompanied by bookbinding, it is essential in completing a print job that the punching tool 501 is aligned with the binding member 417.

In the case of ordinary punching which is not accompanied by bookbinding, there is no subsequent processing that depends on punching. Consequently, a print job can be completed even if the punching tool 501 suitable for designated punching is not necessarily mounted. For example, when the punching tool 501 does not match the kind of punching designated in the job, paper can be delivered to the tray 228 or 229 without performing punching. In this way, depending on the print job which is executed, the die and the binding member 417 are controlled to consist with each other when specific bookbinding is required, and the process of a print job is controlled to be started in other cases.

<Description of Binding Step>

FIGS. 6A to 6D are schematic views illustrating a vicinity of the stacking part 415 illustrated in FIG. 4, and describe an outline of a mechanism of binding.

Figure 6A:
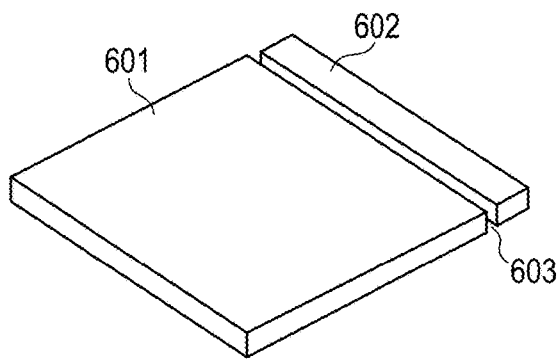
FIGS. 6A, 6B, 6C and 6D are schematic views of a vicinity of a sheet stacking part.

FIG. 6A illustrates a state of the stacking part 415 before starting the process. Members shown by binding member fixing portions 601 and 602 are disposed in parallel. In a space 603 between both the members, the binding member 417, which is cut in accordance with a width (a length in a direction orthogonal to the conveyance direction) of the sheet and is described in FIG. 4, is disposed and fixed.

Figure 6B:
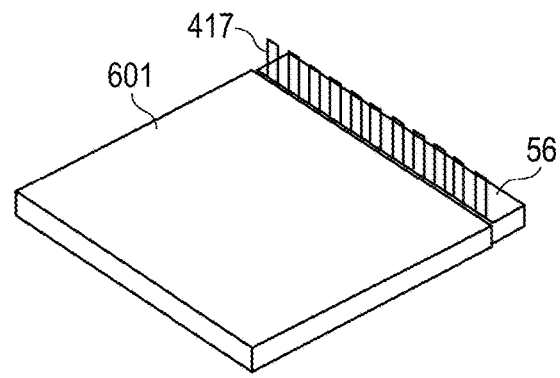
Figure 6C:
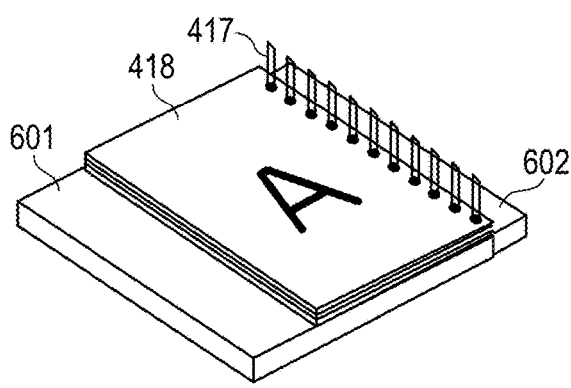
Figure 6D:
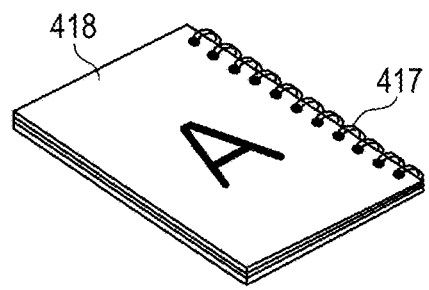

As illustrated in FIG. 6B, after the binding member 417 is fed to the stacking part 415, the binding member 417 is accurately disposed in and fixed to a predetermined position by the binding member fixing portions 602 and 601. Next, as illustrated in FIG. 6C, sheets are stacked one by one to this state in such a manner that the protrusions of the binding member 417 penetrate through the hole portions of the punched sheets. The binding member 417 is controlled to be accurately disposed so that the binding member penetrates, with respect to the number of holes and positions of the holes in the sheets that are conveyed to be stacked. When stack of the final paper is completed, the binding member 417 is folded and deformed, and thereby a bookbinding resultant article as illustrated in FIG. 6D is obtained.

The shapes of the members configuring the stacking part 415, and the binding member are simplified to describe the mechanism of bookbinding according to the present embodiment, and are not limited to the shapes illustrated in FIGS. 6A to 6D.

For example, in order to facilitate bending processing, a case of using a binding member formed in curved shape from the beginning instead of the linear binding member as illustrated in FIGS. 6A to 6D is conceivable. Further, there can be various numbers of holes, various distances and various shapes, and it is needless to say that even they are in any modes, the present invention is applied as long as they satisfy the configurations described in the claims.

In the present embodiment, bookbinding by the bookbinding apparatus 223 is ring bookbinding that folds the binding member and binds into the ring shape in the state in which the binding member penetrates through the holes of a plurality of sheets which are punched by the first apparatus.

Here, the binding member includes shape characteristics mentioned above. Specifically, the binding member is a material that has protruded portions of predetermined lengths continuously formed at predetermined intervals in a square-pulse shape, and can be processed into a ring shape by folding the protruded portions. A wire is suitable as this material, but a plastics member including a fixed strength may be used.

Further, after the sheets of all pages configuring a binding article are stacked in a stack shape, the binding member may be moved so that the binding member penetrates through the hole portions of the sheet stack.

FIGS. 7A to 7E describe modes of a binding portion of a resultant article obtained as a result of carrying out the bookbinding in the present embodiment.

Figure 7A:
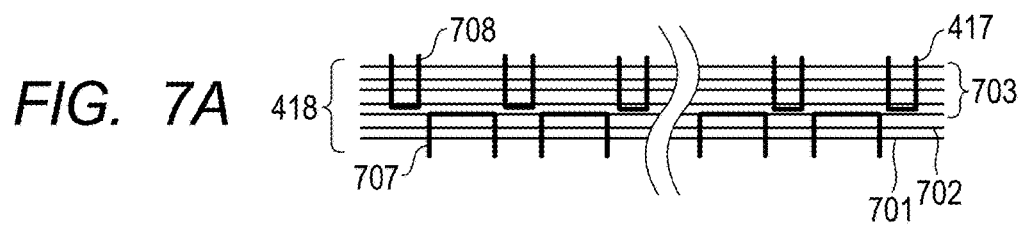
FIGS. 7A, 7B, 7C, 7D and 7E are views describing modes of binding portions of resultant articles.

FIG. 7A expresses the resultant article from a direction of the binding portion of the binding resultant article. FIG. 7A illustrates a state where a first sheet 701, a second sheet 702 and following sheets 703 are stacked in the sheet stacking part 415 in this stacking order, and binding is performed in this state. These sheets through which the binding member 417 penetrates are bound by folding the binding member into the ring shape. Accordingly, as illustrated in FIG. 7A, the binding portion is formed as a shape in which bottom portions 707 and penetrating portions of the binding member 417, that is, upper portions 708 are alternately disposed.

The resultant article in the form in which the bottom portions 707 and the upper portions 708 of the binding portion are alternately exposed significantly impairs fineness mainly in appearance as a resultant article.

Figure 7B:
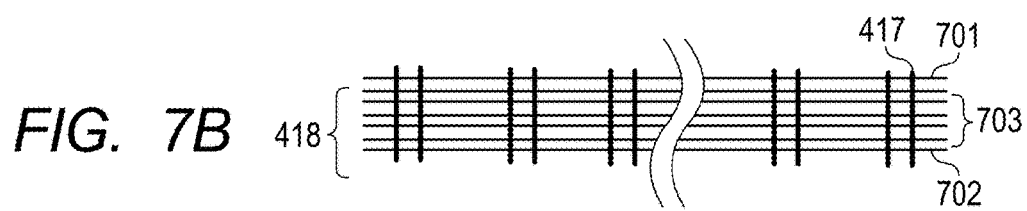

Consequently, as illustrated in FIG. 7B, the first sheet 701 in the resultant article after execution of binding is brought into a state where the first sheet 701 is flipped in an opposite direction of the bookbinding resultant article. Thereby, the state where the bottom portions 707 and the upper portions 708 are exposed as illustrated in FIG. 7A is released, and the resultant article with favorable fineness in appearance can be obtained. The process of flipping the first sheet 701 in the opposite direction is assumed, and the sheet stacking order of the resultant article is determined.

The binding member 417 of a preset size is fed to the bookbinding apparatus 223. Meanwhile, the number of sheets configuring a bookbinding resultant article, or the stack thickness is variable in accordance with the number of pages of the print job data or the type of sheets for use. In order to obtain bookbinding resultant articles of various stack thicknesses by assuming this, in the bookbinding apparatus 223, the binding members 417 of different sizes are replaceable. Thereby, the present embodiment is on the precondition that even bookbinding resultant articles of different stack thicknesses can be properly created.

Figure 7C:
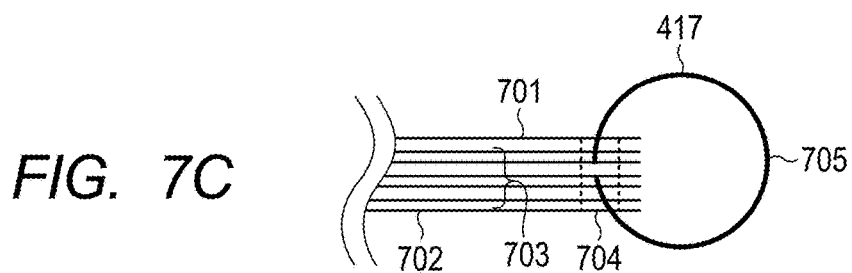
Figure 7D:
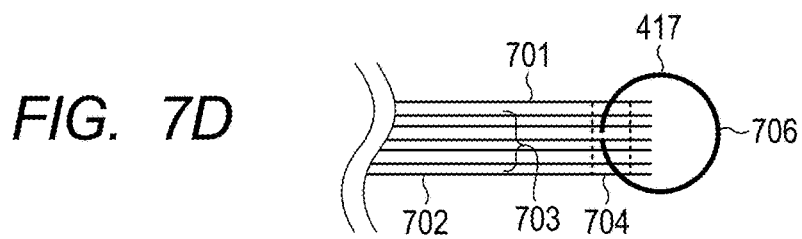

For example, FIG. 7C and FIG. 7D illustrate bookbinding resultant articles in cases of using binding members 705 and 706 that differ in size, from directions to observe sections of the binding members 417. Even for the sheet stacks of the same stack thicknesses, binding using the binding members 417 of different sizes is enabled as long as the sizes of the binding members 417 do not exceed the stack thicknesses.

Figure 7E:
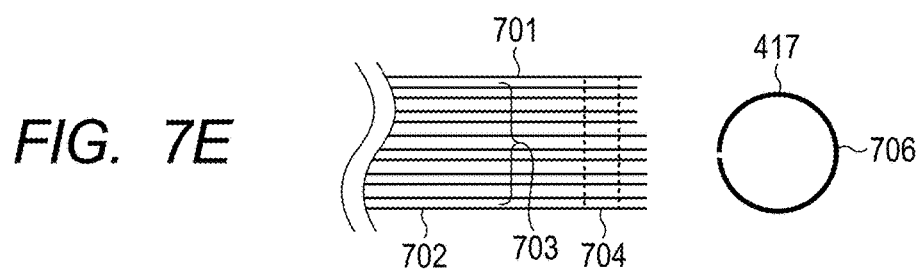

However, as a resultant article, use of the binding member 417 of a suitable size to a stack thickness is more preferable. In fact, this is left to the own personal views of a user using the MFP 101. As illustrated in FIG. 7E, there is a case where the thickness of a stack exceeds the size of the stack which the binding member 417 can bind. In this case, irrespective of the personal views of the user, the creating process of a bookbinding resultant article in the bookbinding apparatus 223 cannot be executed.

In this case, there is no way for the user to obtain a normal resultant article other than performing the process by reducing the stack thickness, or replacing the binding member 417 with the binding member 417 of a larger size.

<Description of Image Displayed on Operation Panel 204>

FIGS. 8A to 8E illustrate UI screens displayed on the operation panel 204 illustrated in FIG. 2.

FIG. 8A is an example of a bookbinding setting screen 800, and FIG. 8B is an example of a setting screen 820 for paper type.

Figure 8E:
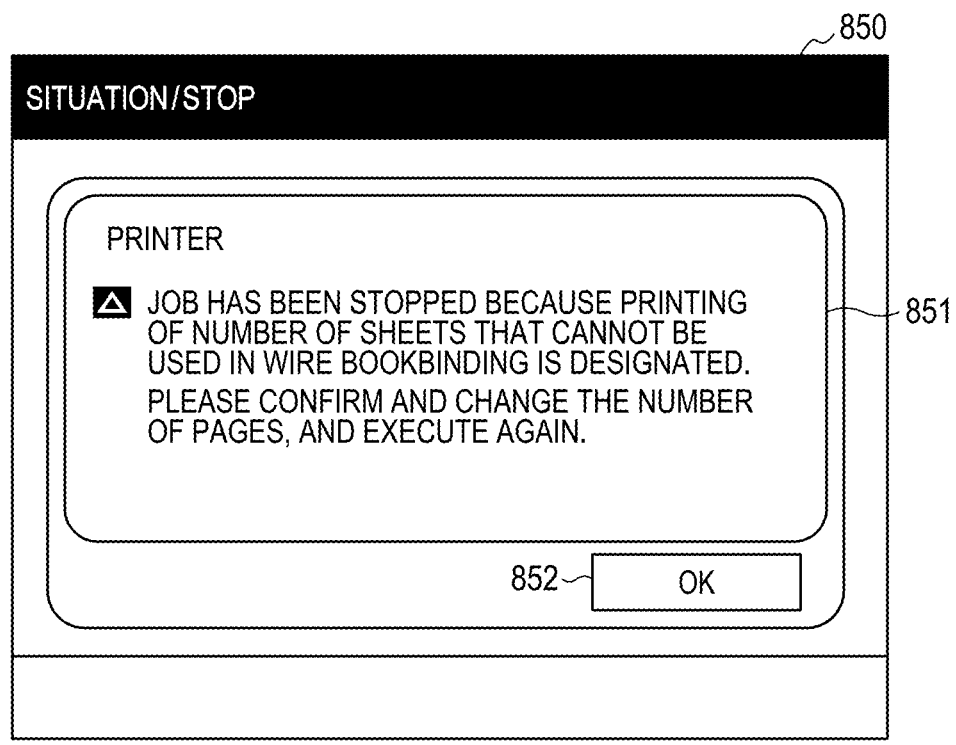

FIG. 8C is an example of a jam detection screen 830 for the stacking part that is a first operation screen, and FIG. 8B is an example of the setting screen 820 for the paper type. FIG. 8D is an example of a jam detection screen 840, and FIG. 8E is an example of a thickness over error screen 850 that is a job setting confirmation screen.

An input to the operation panel 204 from the operator is transmitted to the control part 205, and the screen displayed on the operation panel 204 is switched by an instruction from the control part 205. Hereinafter, examples of the screen displayed on the operation panel 204 and transition of the display screen on the operation panel 204 by the operation of the operator will be described.

When the control part 205 receives an instruction to display the bookbinding setting screen from a standard screen (not illustrated) from the operator, the control part 205 displays the bookbinding setting screen 800 in FIG. 8A on the display unit of the operation panel 204. The bookbinding setting screen 800 is one of screens relating to setting of the job, and is a screen for designating bookbinding imposition and finishing.

In FIG. 8A, imposition designation buttons 801, 802 and 803 are buttons for designating a method for disposing (imposition) of images. Among the imposition designation buttons 801 to 803, the imposition designation button selected by the user is controlled to be displayed in a different color from the other buttons by the control part 205.

In the UI screen illustrated in FIG. 8A, a plurality of imposition designation buttons is not brought into a selected state simultaneously. When another imposition designation button is selected in a state where one of the imposition designation buttons is already in the selected state, the newly selected imposition designation button is brought into the selected state. The selected state of the imposition designation button which is previously in the selected state out of the imposition designation buttons 801 to 803, is released.

When a selected state of any one button of the imposition designation buttons 801 to 803 is stored in the RAM 208, the selection state is set as an initial state. When the selection state is not stored, a state where a "Not perform bookbinding imposition" designation button 803 is selected is set as the initial state.

A "Perform bookbinding imposition" designation button 801 is one of the imposition designation buttons, and by bringing the "Perform bookbinding imposition" designation button 801 into the selected state, saddle stitching bookbinding imposition can be designated. In the saddle stitching bookbinding imposition, the order of images is changed, and two images are printed in each sheet. By folding the center in a finishing process, an output article such as a booklet can be obtained.

A "Perform wire bookbinding imposition" designation button 802 is one of the imposition designation buttons, and by bringing the designation button 802 into the selected state, the wire bookbinding imposition can be designated. As described by using FIG. 7B, in a resultant article of wire bookbinding, a stack order of papers needs to be changed. Specifically, the stack order needs to be changed by changing an image order so that a backmost sheet to be a back cover is outputted first. By selecting the "Perform wire bookbinding imposition" designation button 802, a process that is necessary to change the stack order is carried out.

A "Perform no bookbinding imposition" designation button 803 is one of the imposition designation buttons, and by bringing the designation button 803 into a selected state, performing no bookbinding imposition can be designated. When bookbinding imposition is not designated, one image is printed onto each surface of paper in order. Designation of one side and both sides is settable on a normal imposition designation screen (not illustrated).

In FIG. 8A, finishing designation buttons 804, 805, 806 and 807 are buttons for designating methods for finishing. A selected finishing designation button out of the finishing designation buttons 804 to 807 is displayed in a different color from the colors of the other buttons. A plurality of finishing designation buttons is not brought into a selected state simultaneously. When another finishing designation button is selected in a state where a finishing designation button is already in a selected state, the newly selected finishing designation button is brought into a selected state. The selected state of the finishing designation button which is in the selected state previously is released.

When the selected state of any one finishing designation button out of the finishing designation buttons 804 to 807 is stored in the RAM 208, the selected state is set as an initial state. When the selected state of any one of the finishing designation buttons is not stored in the RAM 208, a state where no finishing designation button 807 is selected is set as the initial state.

A "Folding+saddle stitching" designation button 804 is one of the finishing designation buttons, and by bringing the designation button 804 into a selected state, a process of folding papers in center and a process of binding the papers with a staple can be designated. Designating the designation button 804 with the "Perform bookbinding imposition" designation button 801, a saddle-stitched resultant article in a booklet shape can be obtained.

A "Folding only" designation button 805 is one of the finishing designation buttons, and by bringing the designation button 805 into a selected state, a process of folding printed sheets in center can be designated. By designating the designation button 805 with the "Perform bookbinding imposition" designation button 801, a resultant article in a booklet shape can be obtained.

A "Wire binding" designation button 806 is one of the finishing designation buttons, and by bringing the designation button 806 into a selected state, binding with use of wire can be designated. By designating the designation button 806 with the "Wire bookbinding imposition" designation button 802, an output article that is processed by bookbinding and being bound with the binding member 417 can be obtained.

A "No finishing" designation button 807 is one of the finishing designation buttons, and by bringing the designation button 807 into a selected state, performing no finishing can be designated. When the "No finishing" designation button 807 is selected, and finishing is not performed, a finishing process relating to bookbinding is not performed.

A top cover designation button 808 is a button for designating a top cover. When the top cover designation button 808 is selected, the control part 205 temporarily stores the selected states of the imposition designation buttons 801 to 803 and the finishing designation buttons 804 to 807 in the RAM 208 and displays a top cover setting screen (not illustrated). In the top cover setting screen, a type of paper for use as a top paper and a print surface can be designated. After setting on the top paper setting screen is finished, the control part 205 reads the selected state of the button stored in the RAM 208. The control part 205 displays the bookbinding setting screen 800 in the operation panel 204 after setting the selected state which is read as the initial state.

An opening direction designation button 809 is a button for designating an opening direction of the bookbinding article. When the opening direction designation button 809 is selected, the control part 205 temporarily stores the selected states of the imposition designation buttons 801 to 803 and the finishing designation buttons 804 to 807 in the RAM 208, and displays an opening direction setting screen (not illustrated). In the opening direction setting screen, the opening direction of the bookbinding article can be designated. After setting on the opening direction setting screen ends, the control part 205 reads the selected state of the button stored in the RAM 208. Subsequently, the control part 205 displays the bookbinding setting screen 800 on the operation panel 204 after setting the selected state which is read as the initial state.

The paper setting button 810 is a button for designating paper for use. When the paper setting button 810 is selected, the control part 205 temporarily stores the selected states of the imposition designation buttons 801 to 803 and the finishing designation buttons 804 to 807 in the RAM 208, and displays the setting screen 820 for the paper type. The setting screen 820 for the paper type will be described by using FIG. 8B.

After setting on the setting screen 820 for the paper type is ended, the control part 205 reads the selected state of the button that is stored in the RAM 208. Subsequently, the control part 205 displays the read selected state as the initial state, and thereafter, displays the bookbinding setting screen 800 on the operation panel 204.

A setting cancel button 811 is a button that ends bookbinding setting in the screen illustrated in FIG. 8A. When the control part 205 accepts selection of the setting cancel button 811, the control part 205 abandons designation of the imposition method and the finishing method that is performed in the bookbinding setting screen 800, top cover setting that is performed in the top cover setting screen, designation of the opening direction which is performed in the opening direction setting screen and the paper setting which is performed in the setting screen 820 for the paper type without storing the designation and settings, and causes the screen to transition back to the screen before the transition.

An OK button 812 is a button that ends bookbinding setting in the screen illustrated in FIG. 8A. When the control part 205 accepts an instruction to the OK button 812, the control part 205 stores designation of the imposition method and the finishing method that is performed in the bookbinding setting screen 800, top cover setting that is performed in the top cover setting screen, the opening direction that is performed in the opening direction setting screen, and paper setting that is performed in the setting screen 820 for the paper type in the RAM 208 as settings for use in the job, and causes the screen to transition to a screen of a transition destination.

When none of the top cover designation button 808, the opening direction designation button 809, the paper setting button 810, the setting cancel button 811 and the OK button 812 is selected in the screen illustrated in FIG. 8A, and transition is made from the bookbinding setting screen 800, designation of the imposition method and the finishing method that is performed in the bookbinding setting screen 800, the top cover setting that is performed in the top cover setting screen, designation of the opening direction that is performed in the opening direction setting screen, and the paper setting that is performed in the setting screen 820 for the paper type are abandoned.

However, concerning screen transition that is temporary and returns to the bookbinding setting screen 800 after release, such as screen saver, the temporarily stored settings are not abandoned.

When the paper setting button 810 is selected by the operator in the bookbinding setting screen 800, the control part 205 displays the setting screen 820 for the paper type in FIG. 8B in the operation panel 204. The setting screen 820 for the paper type is a screen for setting the type of paper for use in a bookbinding copy job.

Paper type setting buttons 821, 822, 823, 824, 825, 826 and 827 are buttons for setting a type of paper for use in a bookbinding job. The control part 205 displays a paper type setting button that is selected from the paper type setting buttons 821 to 827 in a different color from a color of the other buttons. Here, a plurality of paper type setting buttons is not brought into a selected state simultaneously. When another paper type setting button is selected in a state where there is a paper type setting button that is already in a selected state, the newly selected paper type setting button is brought into a selected state. The selected state of the paper type setting button that is in the selected state previously is released. When a selected state of the paper type setting button is stored in the RAM 208, the selected state is set as an initial state. When the paper type setting button is not stored, a state where a plain paper button 822 is selected is set as the initial state.

When the control part 205 accepts selection of a setting cancel button 828 that ends paper type setting, the control part 205 abandons the paper setting that is performed in the setting screen 820 for the paper type without storing the paper setting, and makes transition to the bookbinding setting screen 800.

When the control part 205 accepts selection of a next button 829 that ends paper type setting, the control part 205 temporarily stores the selection state of the paper type setting buttons 821 to 827 in the RAM 208, and makes transition to a paper size setting screen (not illustrated).

When a stacking part jam is detected in a print process of a job in which a wire bookbinding function is set, the control part 205 displays a jam detection screen 830 for the stacking part in FIG. 8C in the operation panel 204.

The jam detection screen 830 for the stacking part issues an instruction to remove paper stacked in the stacking part 415 and the binding member which has been placed. Detection of the stacking part jam has been described with use of FIG. 4.

When the control part 205 receives an input of a close button 831 that ends the jam detection screen 830 for the stacking part, the control part 205 erases the jam detection screen 830 for the stacking part that is displayed on the operation panel 204, and makes transition to the screen that is displayed before displaying the jam detection screen 830 for the stacking part. When the close button 831 is selected, and the jam detection screen 830 for the stacking part is ended, the jam is not eliminated, and the job is not ended. By selecting a job situation screen display button (not illustrated), the jam detection screen 830 for the stacking part can be displayed again.

A jam position display area 832 is an area where a position in which a stacking part jam has occurred is displayed. A portion shown by a black circle is a jam occurrence portion.

A jam message display area 833 for the stacking part displays a message showing the occurrence spot of the stacking part jam and a procedure of eliminating the jam. As for display contents, not only sentences but also images, animation or moving images may be used. The procedure for eliminating stacking part jam is an operation of removing the binding member 417 which has been placed from the space 603 between the binding member fixing portions 601 and 602, and an operation of removing a paper stack from the stacking part 415. When the paper conveyance sensor 440 detects remaining of paper in a set of copy, an operation of removing the paper from the part is included.

When a jam at an upstream side of the stacking part is detected in the bookbinding apparatus, the control part 205 displays a jam detection screen 840 in FIG. 8D in the operation panel 204. The jam detection screen 840 issues notice of occurrence of jam.

When the control part 205 receives input of the close button 841 that ends the jam detection screen 840, in FIG. 8D, the control part 205 erases the jam detection screen 840 that is displayed in the operation panel 204, and makes transition to the screen that is displayed before the jam detection screen 840 is displayed. When the close button 841 is selected and the jam detection screen 840 is ended, the jam is not eliminated, and the job is not ended. By selecting a job situation screen display button (not illustrated), the jam detection screen 840 can be displayed again.

The jam message display area 843 displays a procedure for eliminating the jam. Images, animation or moving images may be used, besides displaying sentences. The procedure for eliminating the jam is an operation of removing paper that is detected as remaining by the paper conveyance sensors 424 to 441.

The jam message display area 843 displays a message for issuing notice of occurrence of the jam. The occurrence spot of the jam and explanation of operations necessary to eliminate the jam are displayed.

When a stacking part jam occurs, and elimination of the jam is detected, the control part 205 displays a thickness over error screen 850 in FIG. 8E in the operation panel 204. The thickness over error screen 850 issues notice that a paper stack cannot be bound with the binding member 417 that is mounted.

An error display area 851 displays a content of an error. In this example, a message is displayed, which indicates that the job cannot be completed because the number of sheets configuring a sheet stack that is to be wire-bounded exceeds the number of sheets that can be bookbound.

When the control part 205 receives an input of an OK button 852 that ends the thickness over error screen 850, the control part 205 erases the thickness over error screen 850 displayed in the operation panel 204, and makes transition to a screen that is displayed before the thickness over error screen 850 is displayed.

<Flowchart of Wire Bookbinding Job Processing>

FIG. 9 is a flowchart describing a method for controlling the image forming apparatus illustrating the present embodiment. The present flow is a procedure of a process of the control part 205 in a case of accepting a job including wire bookbinding, that is, a print job in which wire bookbinding setting is made. Each step is realized by the CPU included by the control part 205 executing a stored control program.

In S901, the control part 205 carries out a wire bookbinding job. Details of the wire bookbinding job are described with use of FIGS. 4 to 7E. When detection of an event is accepted during implementation of the wire bookbinding job, the flow goes to S902, and when detection of an event is not accepted, the flow remains in S901.

In S902, the control part 205 determines whether a notice accepted during implementation of the wire bookbinding job is an output completion notice indicating that all sets of copies are output to the resultant article tray 422. Specifically, the control part 205 detects that a bookbinding article that is a final set carried out in the wire bookbinding job is output to the resultant article tray 422, and thereby determines whether the notice is the output completion notice of the all sets of copies. When the control part 205 determined that the control part 205 detects the output completion notice of the all sets of copies, the control part 205 ends the flowchart of the wire bookbinding job. When the control part 205 determines that the control part 205 does not detect the output completion notice of all the parts, the control part 205 advances the process to S903.

In S903, the control part 205 determines whether the notice accepted during implementation of the wire bookbinding job is detection of a jam. Detection of a jam is described with use of FIG. 4. When the control part 205 determines that the control part 205 detects a jam, the control part 205 advances the process to S904. When the control part 205 determines that the control part 205 does not detect a jam, the control part 205 returns the process to S901.

In S904, the control part 205 determines whether the detected jam is stacking part jam. The stacking part jam is described with use of FIG. 4. Here, an example is cited, which is a case of detecting stacking part jam by an elapsed time after the sheets start to be stacked in the stacking part exceeds a specified time. When the control part 205 determines that the detected jam is stacking part jam, the control part 205 advances the process to S905. When the control part 205 determines that the detected jam is not a stacking part jam, the control part 205 advances the process to S906.

In S905, the control part 205 displays the jam detection screen 830 for the stacking part on the operation panel 204. Details of the jam detection screen 830 for the stacking part are described with use of FIG. 8C. When the control part 205 displays the jam detection screen 830 for the stacking part in the operation panel 204, the control part 205 advances the process to S907.

In S906, the control part 205 displays the jam detection screen 840 in the operation panel 204. The jam detection screen 840 is described with use of FIG. 8D. When the control part 205 displays the jam detection screen 840 in the operation panel 204, the control part 205 advances the process to S908.

In S907, the control part 205 determines whether the stacking part jam is eliminated by the user. When the control part 205 determines that the stacking part jam is eliminated by the user, the control part 205 advances the process to S908. When the control part 205 determines that the stacking part jam is not eliminated by the user, the control part 205 returns the process to S905. Elimination of the stacking part jam is described with use of FIGS. 4 and 8C. When the control part 205 accepts elimination of the stacking part jam, the control part 205 advances the process to S909.

In S909, the control part 205 cancels the wire bookbinding job. In addition, the control part 205 deletes the set information and the image data concerning the wire bookbinding job that are stored in the HDD 209, and advances the process to S911.

In S910, the control part 205 restarts the wire bookbinding job from a beginning page configuring the set of copy in which the jam has occurred. When the control part 205 accepts detection of an event during implementation of the wire bookbinding job after the restart, the control part 205 returns the process to S902. When the control part 205 determines that the control part 205 does not accept detection of an event during implementation of the wire bookbinding job, the control part 205 waits for the process in S910.

In S911, the control part 205 displays the thickness over error screen 850. The thickness over error screen 850 is described with use of FIG. 8E. After the control part 205 displays the thickness over error screen 850, the control part 205 advances the process to S912.

In S908, the control part 205 waits for the jam occurring in the MFP 101 to be eliminated. Jam elimination is described by using FIGS. 4 and 8D. After the control part 205 accepts detection of jam elimination, the control part 205 advances the process to S910.

In S912, the control part 205 waits for input from an operator who operates the operation panel 204. After the control part 205 accepts input from the operator, the control part 205 advances the process to S913.

In S913, the control part 205 determines whether the input from the operator which the control part 205 accepts in S912 is an input by operating the OK button 852. When the control part 205 determines that the input is the operation of operating the OK button 852, the control part 205 ends the flow of the wire bookbinding job processing. When the control part 205 determines that the input is not the operation of operating the OK button 852, the control part 205 advances the process to S912.

According to the present embodiment, in the case where a paper stack cannot be conveyed to the resultant article tray 422 because the thickness of the paper stack exceeds the thickness that enables binding in the stacking part 415 of the bookbinding apparatus 223, and binding cannot be carried out in implementation of the wire bookbinding job, the case is detected as a stacking part jam.

In a stacking part jam, unlike an ordinary jam, the jam detection screen 830 for the stacking part is displayed, and elimination of the jam is instructed to the operator. Subsequently, after the jam is eliminated, the thickness over error screen 850 is displayed and the wire bookbinding job is cancelled.

In this way, the binding is actually performed to determine whether the binding is enabled, and even if it is determined that the binding cannot be performed, cancelation is performed without restarting the job after the jam elimination operation. Consequently, the jam can be prevented from occurring again due to an excessive thickness of a paper stack. Accordingly, even when the number of papers of the sheet stack to be bound by the binding member is made a maximum binding allowable number that is set in advance, and the sheet stack cannot be actually bound, the process can be properly performed.

Second Embodiment

In the first embodiment, the case is described, in which a wire bookbinding job is cancelled after a jam elimination operation when the thickness of a paper stack exceeds the thickness that can be bound by the binding member 417. However, when an operator can prepare a larger binding member, printing can be restarted after replacement of the binding member.

In a second embodiment, a case of performing control so as to be able to restart printing by replacing the binding member after elimination of the stacking part jam will be described.

<Explanation of Image to be Displayed in Operation Panel 204>

Figure 10A:
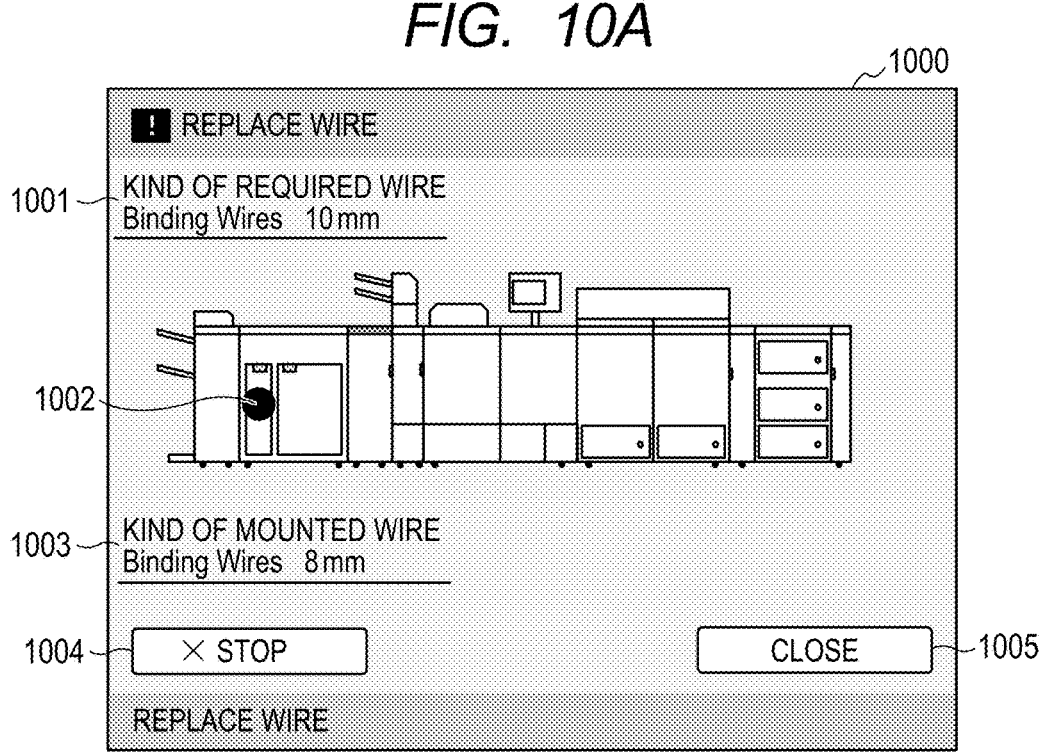
FIGS. 10A and 10B are UI screens that are displayed on the operation panel.
Figure 10B:
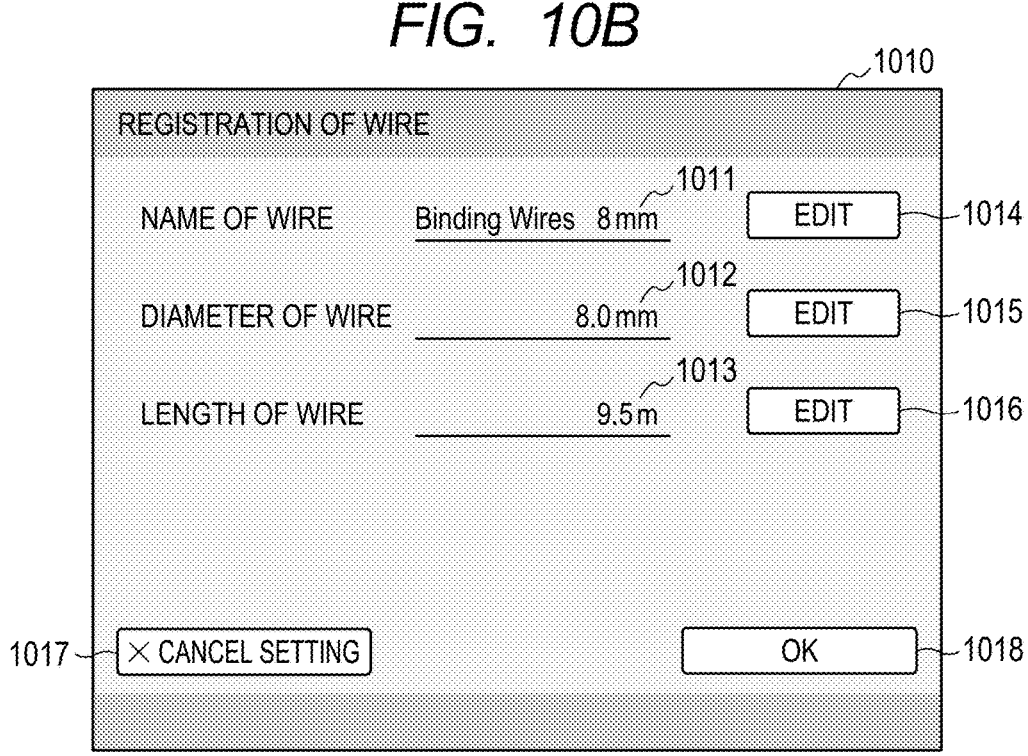

FIGS. 10A and 10B illustrate UI screens that are displayed in the operation panel 204 illustrated in FIG. 2. Explanation of the elements having the same reference signs as in the first embodiment will be omitted.

FIG. 10A is a replacement request screen 1000 for the binding member that is a second operation screen. FIG. 10B is a binding member registration screen 1010.

When elimination of the stacking part jam is detected, the control part 205 displays the replacement request screen 1000 for the binding member in FIG. 10A in the operation panel 204. The replacement request screen 1000 for the binding member requests an operator to replace the binding member with a larger binding member than the binding member at the time of the stacking part jam occurring.

In FIG. 10A, a replacement wire display area 1001 displays a kind of the binding member which is requested. In the replacement wire display area 1001, information for identifying the kind of the binding member is displayed. The binding member which is larger than the binding member which was mounted when the stacking part jam occurred, that is, the binding member which is displayed in a mounted wire display area 1003 is displayed in the replacement wire display area 1001. The binding member to be displayed may be selected from all binding members compatible with the bookbinding apparatus 233, or may be selected based on information of the binding members registered by the operator through the binding member registration screen 1010.

A wire replacement position mark 1002 shows a position of a wire to be replaced. The mounted wire display area 1003 displays the kind of the binding member which is currently mounted. In the mounted wire display area 1003, information for identifying the kind of a binding member is displayed.

In the replacement request screen 1000 for the binding member, a replacement procedure may be displayed by using an animation, besides sentences and images.

When the control part 205 accepts selection of a stop button 1004 that stops a job in FIG. 10A, the control part 205 stops the accepted job. In addition, the control part 205 abandons set information and image data concerning a job stored in the HDD 209.

Further, the control part 205 ends the replacement request screen 1000 for the binding member displayed on the operation panel 204, and performs control of causing the screen on the operation panel 204 to transition back to a screen of a transition destination.

When the control part 205 accepts an operation of a close button 1005 that ends the replacement request screen for binding member, the control part 205 ends the replacement request screen 1000 for the binding member that is displayed on the operation panel 204, and causes the screen to transition back to the screen of the transition destination. In this case, a suitable binding member is not mounted, so that the job remains in a suspended state without being restarted.

When binding member registration is selected from a binding member management screen (not illustrated), the control part 205 displays the binding member registration screen 1010 in FIG. 10B in the operation panel 204. The binding member registration screen 1010 is a screen for registering information of a binding member that is used by the operator.

A wire name 1011 is an area displaying a name of a binding member which is registered. When an edit button 1014 for wire is selected and the name of a binding member is inputted by using a soft keyboard (not illustrated), the input name is displayed. When edit of the registered binding member information is selected in the wire management screen, a value that is read from the HDD 209 is displayed in the wire name 1011 in advance.

A wire diameter 1012 is an area displaying a diameter of a binding member to be registered. When an edit button 1015 for a binding member diameter is selected, and the diameter of the binding member is input, the input diameter is displayed in the wire diameter 1012. When edit of the registered binding member information is selected in the wire management screen, a value read from the HDD 209 is displayed in the wire diameter 1012 in advance.

A wire length 1013 is an area displaying a length of a binding member to be registered. When an edit button 1016 for a wire length is selected, and the length of the binding member is input, the input length is displayed. When edit of the registered binding member information is selected in the wire management screen, a value read from the HDD 209 is displayed in the wire length 1013 in advance.

The edit buttons 1014, 1015 and 1016 are buttons for inputting the wire name, a diameter of a ring (the diameter at the time of processing the wire into a ring shape), and the wire length, respectively. When the edit buttons 1014 to 1016 are selected, edit screens (not illustrated) are displayed, and accept inputs from the operator. When the control part 205 accepts completion of the inputs, the control part 205 temporarily stores the accepted inputs in the RAM 208 to end the edit screens, and makes transition to the binding member registration screen 1010.

The control part 205 displays values that are input to the wire name 1011, the ring diameter 1012 and the wire length 1013 corresponding to the edit buttons 1014 to 1016 after transition on the binding member registration screen 1010 in FIG. 10B.

A setting cancel button 1017 is a button for ending registration of a binding member. When the control part 205 accepts selection of the setting cancel button 1017, the control part 205 abandons the information of the binding member that is performed in the binding member registration screen 1010 without storing the information in the HDD 209. The control part 205 ends display of the binding member registration screen 1010, and causes the screen that is displayed to transition to the binding member management screen.

When the control part 205 accepts selection of an OK button 1018 that ends registration of a binding member, the control part 205 stores the information of the binding member that is input in the binding member registration screen 1010 in the HDD 209. Subsequently, the control part 205 ends display of the binding member registration screen 1010, and causes the display screen to transition to the binding member management screen. The OK button 1018 is selectable only when all required information is input. That is, the OK button 1018 is in a selectable state only when the values are input in the wire name 1011, the ring diameter 1012 and the wire length 1013, and is unselectable when the values are not input therein.

<Flowchart of Wire Bookbinding Job Processing>

Figures 11, 11A:
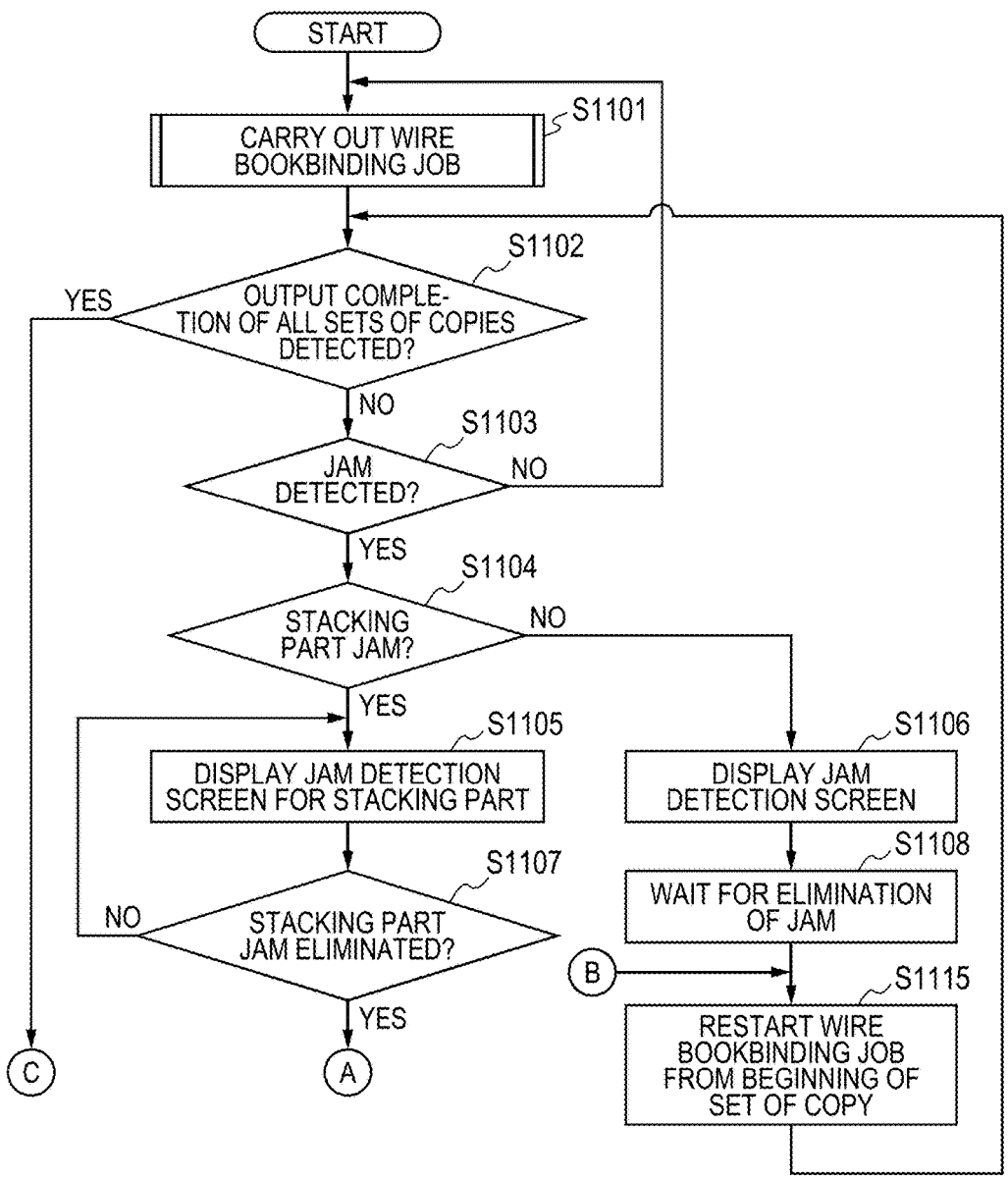
FIG. 11 is consists of FIG. 11A and FIG. 11B, and is a flowchart describing a method for controlling the image forming apparatus.
Figure 11B:
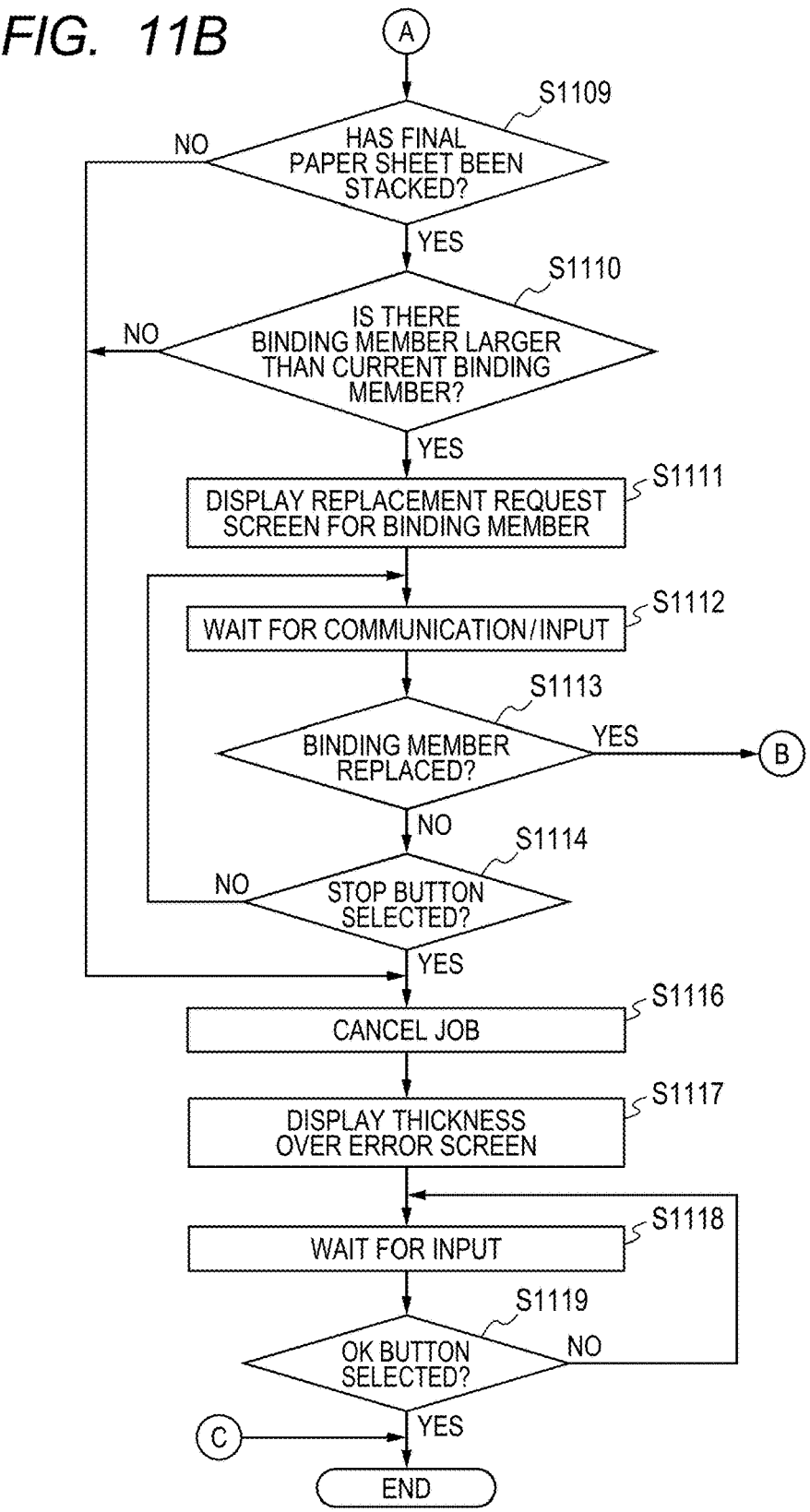

FIG. 11 is a flowchart describing a method for controlling the image forming apparatus illustrating the present embodiment. The present flow is a procedure of a process of the control part 205 at a time of accepting a job including the wire bookbinding, that is, a copy or print to which wire bookbinding setting is performed. Each step is realized by the CPU included by the control part 205 executing a stored control program. Explanation of S1101 to S1108 that are the same as S901 to S908 of the first embodiment will be omitted.

In S1109, the control part 205 determines whether or not a paper of a last sheet of a set of copy has been stacked in the stacking part 415 at a time of occurrence of the stacking part jam. The control part 205 determines whether the last paper has been stacked based on whether the last paper has passed the paper conveyance sensor 440 at the carry-in port to the binding member processing part. When the control part 205 determines that the last paper has been stacked in the stacking part 415, the control part 205 advances the process to S1110. When the control part 205 determines that the last paper is not stacked in the stacking part 415 yet, the control part 205 advances the process to S1116. When the last paper is not stacked yet, there is a possibility that all papers configuring the bookbinding article are originally of such a thickness that all the papers cannot be stacked in the stacking part. Consequently, even if the job is redone, a stacking part jam is highly likely to occur again. Consequently, in S1116, the control part 205 cancels the job.

In S1110, the control part 205 determines whether there is a binding member having a larger ring diameter than the binding member which is currently mounted. The determination may be performed for all the binding members compatible with the bookbinding apparatus 223 as a target. Alternatively, determination may be performed with the binding members registered by the operator from the binding member registration screen 1010 as the target of determination, and with use of the ring diameters of the binding members registered by the operator. When the control part 205 determines that there is a binding member having a larger ring diameter than the binding member which is currently mounted, the control part 205 advances the process to S1111. When the control part 205 determines that there is no binding member having a larger ring diameter than the binding member which is currently mounted, the control part 205 advances the process to S1116.

In S1111, the control part 205 displays the replacement request screen 1000 for the binding member on the operation panel 204. The replacement request screen 1000 for the binding member is described with use of FIGS. 10A and 10B. When the control part 205 displays the replacement request screen 1000 for the binding member, the control part 205 advances the process to S1112.

In S1112, the control part 205 waits for communication with the bookbinding apparatus 223 or input from the operation panel 204. After the control part 205 accepts communication with the bookbinding apparatus 223 or the input from the operation panel 204, the control part 205 advances the process to S1113.

In S1113, the control part 205 determines whether communication with the bookbinding apparatus 223 or the input from the operation panel 204 is detection or input of replacement of the binding member. Specifically, detection of replacement of the binding member may be performed by the bookbinding apparatus 223 automatically detecting the kind of the binding member with which replacement is performed, or may be performed by the input from the operator by using a binding member replacement screen (not illustrated). When the control part 205 accepts the replacement of the binding member, the control part 205 advances the process to S1115. When the control part 205 determines that the control part 205 does not accept replacement of the binding member, the control part 205 advances the process to S1114.

In S1114, the control part 205 determines whether the input accepted via the operation panel 204 is a process of operating the stop button 1004. When the control part 205 determines that the control part 205 accepts input of the stop button 1004, the control part 205 advances the process to S1116. When the control part 205 determines that the control part 205 does not accept input of the stop button 1004, the control part 205 advances the process to S1112. Since S1115 is the same as S910, and S1116 to S1119 are the same as S909 to S913, description will be omitted.

As above, the print apparatus realized in the present embodiment displays the replacement request screen 1000 for the binding member so as to replace the binding member with a binding member having a larger ring diameter when the thickness of the paper stack exceeds the thickness that can be bound in the stacking part 415 of the bookbinding apparatus 223 in implementation of the wire bookbinding job, and the job can be restarted by replacement of the binding member.

When the control part 205 accepts replacement of the binding member by detection from the bookbinding apparatus 223, or input from the operation panel 204, in the state where the replacement request screen 1000 for the binding member is displayed, the control part 205 restarts the job by using the binding member with which replacement is performed. In this way, when the bookbinding job cannot be carried out, time and effort of the operator can be reduced by presenting the binding member replacement work necessary to carry out the bookbinding job.

Third Embodiment

In the second embodiment, a job can be restarted by replacing the binding member 417 when the thickness of a paper stack exceeds the thickness that can be bound by the binding member 417. However, print can be restarted by changing the paper to thinner paper. In the present embodiment, the embodiment that can restart print by changing paper to thinner paper will be described.

<Description of Image Displayed in Operation Panel 204>

Figure 12A:
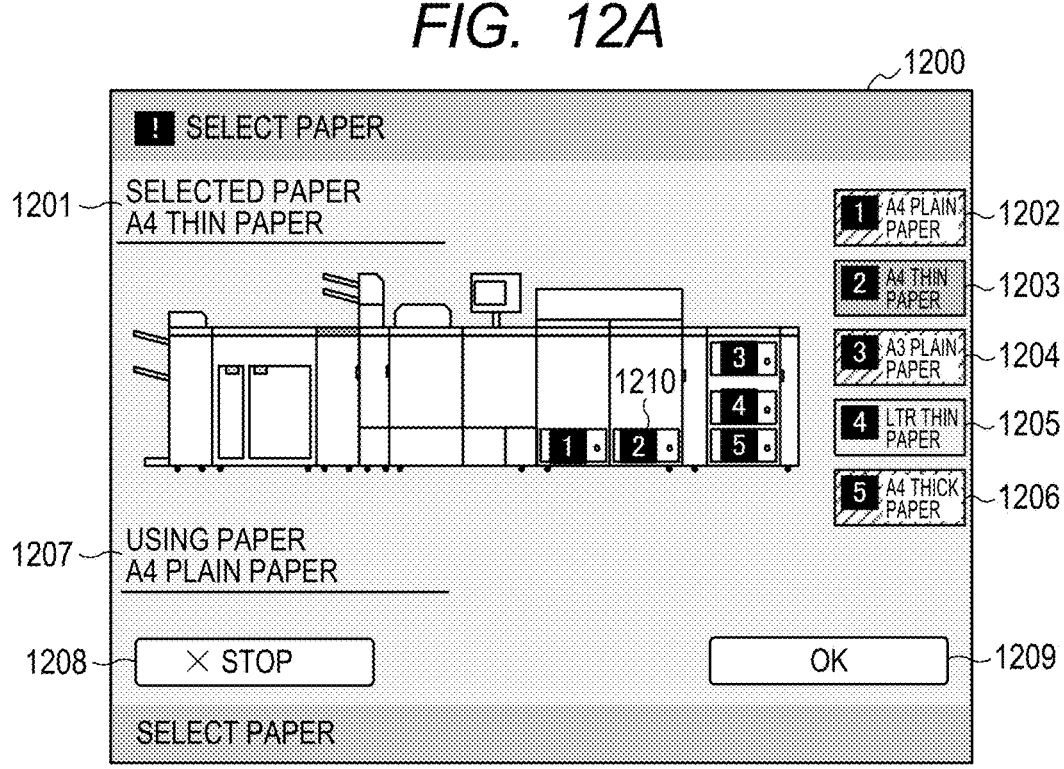
FIGS. 12A and 12B are UI screens that are displayed on the operation panel.
Figure 12B:
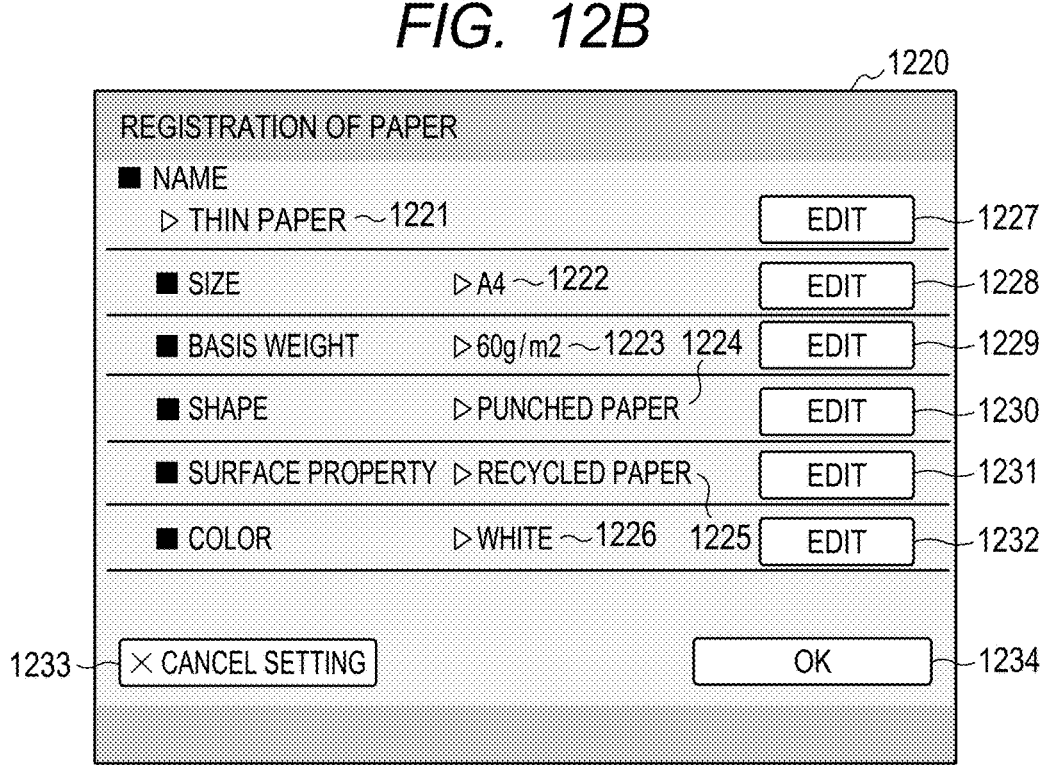

FIGS. 12A and 12B are an example of a paper-replacement request screen illustrating UI screens displayed on the operation panel 204 illustrated in FIG. 2. Explanation of the same components as those in the first embodiment or the second embodiment will be omitted.

FIG. 12A is a paper replacement request screen 1200 that is a third operation screen, which is displayed by control of the control part 205. FIG. 12B is a paper registration screen 1220, which is displayed by control of the control part 205.

When elimination of the stacking part jam is detected, the control part 205 displays the paper replacement request screen 1200 in FIG. 12A on the operation panel 204. The paper replacement request screen 1200 requests an operator to replace the paper with paper thinner than the paper at the time of the stacking part jam occurring.

In FIG. 12A, a display area 1201 for exchange-paper information displays information on paper that is used instead, that is, paper that is set in a paper feeding unit selected among paper selection buttons 1202, 1203, 1204, 1205 and 1206, and displays information for identifying the type of paper.

The paper selection buttons 1202 to 1206 are buttons for selecting paper that is used instead of the paper that is used when the stacking part jam is detected. The respective buttons correspond to a plurality of sheet feeding parts 225 illustrated in FIG. 1 respectively, and can select paper that is set in the corresponding sheet feeding part 225. In the paper replacement request screen 1200, the control part 205 performs control so that the selected paper selection button is displayed in a different color from the other buttons. A plurality of paper selection buttons is not in a selected state simultaneously. When another paper selection button is selected in a state where a paper selection button is already in a selected state, the newly selected paper selection button is brought into a selected state. The selected state of the paper selection button which is in the selected state previously is released.

In the present embodiment, among the paper selection buttons 1202 to 1206, only the paper selection buttons that correspond to the sheet feeding part 225 in which paper with a thickness thinner than the paper that was used when the stacking part jam occurred are selectable. That is, only a paper size that is capable of being actually bookbound is selectable. The determination is described with use of FIG. 14.

As in FIGS. 12A and 12B, A3 is set as a size unusable in a wire bookbinding job, thick paper is set as paper thicker than plain paper, and the paper selection buttons 1202, 1204 and 1206 are set as unselectable (in the drawing, illustrated by oblique lines). While the paper selection buttons 1203 and 1205 are selectable, the paper selection button 1203 is currently in a selected state. A display area 1207 for using-paper information displays information on paper that is used in the job, and displays information (A4, plain paper) for identifying the type of paper.

A stop button 1208 is a button for stopping a job. When the control part 205 accepts selection of the stop button 1208, the control part 205 stops the job that is executed. When the control part 205 stops the job, the control part 205 abandons set information and image data concerning the job that are stored in the HDD 209. Further, the control part 205 ends the paper replacement request screen 1200 which is displayed on the operation panel 204, and executes control of causing the screen to transition back to a screen of a transition destination.

An OK button 1209 is a button for ending the paper replacement request screen 1200. When the control part 205 accepts an instruction to the OK button 1209, the control part 205 stores the paper set in the sheet feeding part 225 corresponding to the selected paper selection button, in the RAM 208, as paper to be used. Subsequently, the control part 205 ends the paper replacement request screen 1200, and causes the screen to transition back to the screen before transition. The OK button 1209 is controlled to be selectable by the control part 205 only when any one of the paper selection buttons is selected. The OK button 1209 is controlled to be unselectable when none of the paper selection buttons is selected.

A display area 1210 for a selected sheet feeding part is an area for displaying positions of the sheet feeding parts 225 corresponding to the paper selection buttons 1202 to 1206 which are selected.

When paper registration is selected from a paper management screen (not illustrated), the control part 205 displays the paper registration screen 1220 in FIG. 12B on the operation panel 204. The paper registration screen 1220 is a screen for registering information on paper that is used by the operator.

In FIG. 12B, a paper name 1221 displays a name of paper to be registered. When an edit button 1227 is selected, and the name of paper is input, the input paper name is displayed in the paper name 1221. When edit of registered paper information is selected in the paper registration screen 1220, a value read from the HDD 209 is displayed in the paper name 1221 in advance.

The paper size 1222 displays a size of the paper to be registered. When a paper size edit button 1228 is selected and the size of paper is input, the control part 205 displays the input size in the paper size 1222. When edit of registered paper information is selected in the paper management screen, the control part 205 displays a value read from the HDD 209 in the paper size 1222 in advance.

A paper basis weight 1223 displays a basis weight of the paper to be registered. When a paper basis weight edit button 1229 is selected, and the basis weight of the paper is input, the control part 205 displays the input basis weight in the paper basis weight 1223. When edit of the registered paper information is selected in the paper management screen, the control part 205 displays a value read from the HDD 209 in the paper basis weight 1223 in advance.

A paper shape 1224 displays a shape of the paper to be registered. When a paper shape edit button 1230 is selected and the shape of the paper is input, the control part 205 displays the input shape in the paper shape 1224. As examples of the shape of paper, punched paper and non-punched paper are cited. When edit of the registered paper information is selected in the paper management screen, the control part 205 displays a value read from the HDD 209 in the paper shape 1224 in advance.

A paper surface property 1225 displays a surface property of paper to be registered. When a paper surface property edit button 1231 is selected and a surface property of the paper is input, the control part 205 displays the input surface property in the paper surface property 1225. As examples of the surface property, recycled paper, coated paper and embossed paper are cited. When edit of the registered paper information is selected in the paper management screen, the control part 205 displays a value read from the HDD 209 in the paper surface property 1225 in advance.

A paper color 1226 displays a color of paper to be registered. When a paper color edit button 1232 is selected and a color of the paper is input, the control part 205 displays the input color in the paper color 1226. When edit of the registered paper information is selected in the paper management screen, the control part 205 displays a value read from the HDD 209 in the paper color 1226 in advance.

The edit buttons 1227 to 1232 are buttons for inputting the name, size, basis weight, shape, surface property and color of paper respectively. When any one of the edit buttons is selected, an edit screen (not illustrated) is displayed, and accepts input from the operator. When the control part 205 accepts completion of the input, the control part 205 temporarily stores the accepted input in the RAM 208 and ends the edit screen, and makes transition to the paper registration screen 1220.

After the control part 205 makes transition to the paper registration screen 1220, the control part 205 displays values that are inputted in the paper name 1221, the paper size 1222, the paper basis weight 1223, the paper shape 1224, the paper surface property 1225, and the paper color 1226 that correspond to the respective edit buttons 1227 to 1232.

A setting cancel button 1233 is a button for ending registration of paper. When the control part 205 accepts selection of the setting cancel button 1233, the control part 205 abandons the information on paper that is input in the paper registration screen 1220 without storing the information of paper in the HDD 209. Subsequently, the control part 205 ends the paper registration screen 1220 and transitions the display screen to the paper management screen.

An OK button 1234 is a button for ending registration of paper. When the control part 205 accepts selection of the OK button 1234, the control part 205 stores the information of the paper that is input in the paper registration screen 1220 into the HDD 209, ends the paper registration screen 1220, and makes transition to the paper management screen.

The OK button 1234 is selectable only when all required information is input. That is, the OK button 1234 is selectable only when the values are input in the paper name 1221, the paper size 1222, the paper basis weight 1223, the paper shape 1224, the paper surface property 1225 and the paper color 1226, and when the values are not input, the OK button is unselectable.

<Flowchart of Wire Bookbinding Job Processing>

Figure 13B:
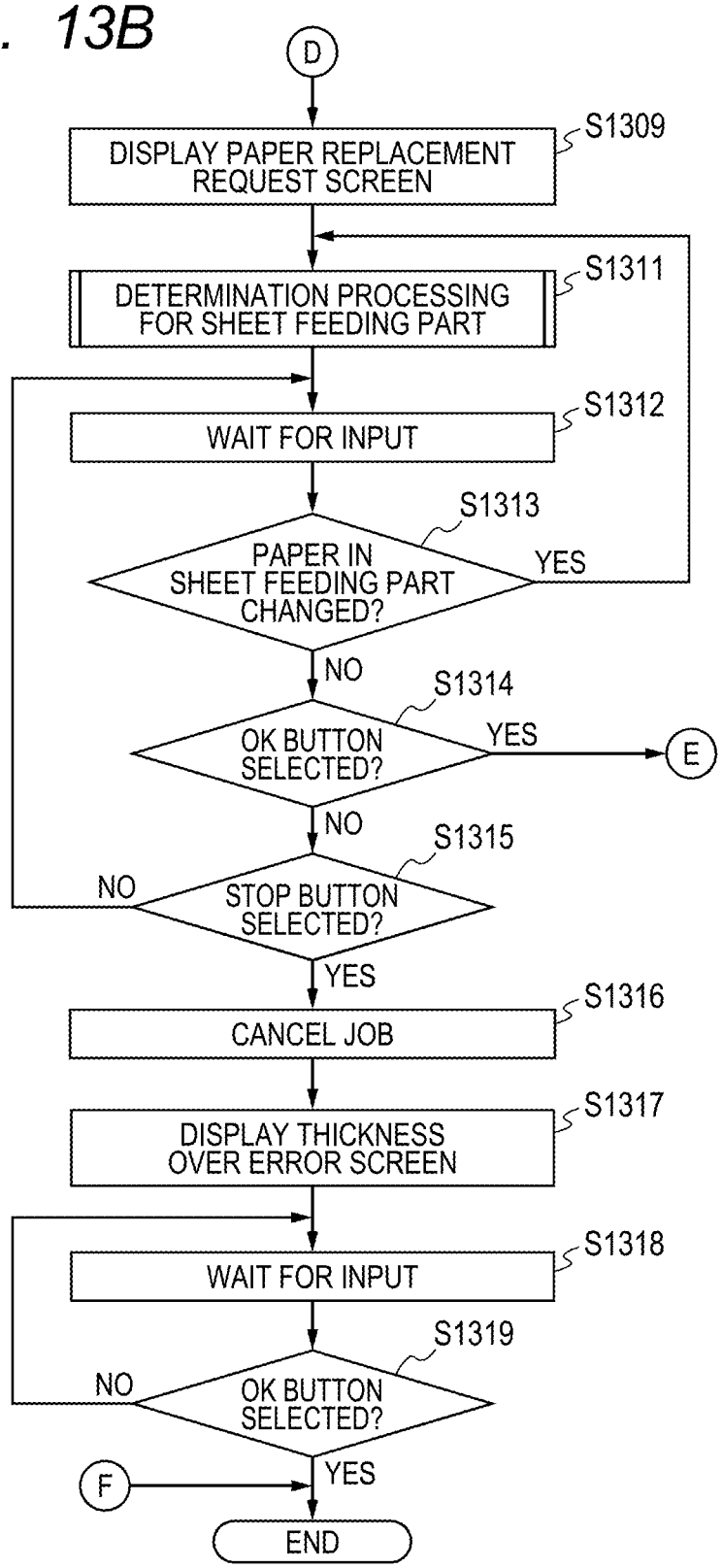
FIG. 13 is consists of FIG. 13A and FIG. 13B, and is a flowchart describing a method for controlling the image forming apparatus.

FIG. 13 is a flowchart describing a method for controlling the image forming apparatus illustrating the present embodiment. The present flow is an example of a process of the control part 205 at a time of accepting a job including wire bookbinding, that is, copy or print to which wire bookbinding settings are performed. Explanation concerning the same processes S1301 to S1309 as S1101 to S1109 in the second embodiment will be omitted. Each step is realized by the control part 205 executing a stored control program.

In S1310, the control part 205 restarts the wire bookbinding job from an initial page of a set of copy where a jam has occurred. At this time, the control part 205 changes paper to be used to paper after change. When the control part 205 accepts detection of an event during implementation of the wire bookbinding job after the restart, the control part 205 advances the process to S1302. When the control part 205 determines that the control part 205 does not accept detection of an event during implementation of the wire bookbinding job, the control part 205 waits for the process in S1310.

In S1311, the control part 205 determines that all the sheet feeding parts 225 are not determined yet, and displays the paper replacement request screen 1200 on the operation panel 204. The paper replacement request screen 1200 is described with use of FIG. 12A. After the control part 205 displays the paper replacement request screen 1200, the control part 205 advances the process to S1311.

In S1311, the control part 205 performs determination processing for the sheet feeding part. The determination processing for the sheet feeding part will be described with use of FIG. 14. After the control part 205 performs the determination processing for the sheet feeding part, the control part 205 advances the process to S1312.

In S1312, the control part 205 waits for input from the operation panel 204. After the control part 205 accepts the input from the operation panel 204, the control part 205 advances the process to S1313. In S1313, the control part 205 determines whether the control part 205 accepts input to change the sheet feeding part 225 (paper) to be used. When the control part 205 determines that the control part 205 accepts the input to change the sheet feeding part 225, the control part 205 determines that the accepted sheet feeding part is not determined yet, and the control part 205 returns the process to S1311. When the control part 205 determines that the control part 205 does not accept the input to change the sheet feeding part 225, the control part 205 advances the process to S1314.

In S1314, the control part 205 determines whether the accepted input is input for operating the OK button 1209. When the control part 205 determines that the control part 205 accepts the input of the OK button 1209, the control part 205 advances the process to S1310. When the control part 205 determines that the control part 205 does not accept the input of the OK button 1209, the control part 205 advances the process to S1315.

In S1315, the control part 205 determines whether the accepted input is input for operating the stop button 1208. When the control part 205 determines that the control part 205 accepts the input of the stop button 1208, the control part 205 advances the process to S1316. When the control part 205 determines that the control part 205 does not accept the input of the stop button 1208, the control part 205 advances the process to S1312. Since S1316 to S1319 are the same as S1116 to S1119, explanation thereof will be omitted.

<Flowchart of Determination Process for the Sheet Feeding Part>

Figure 14:
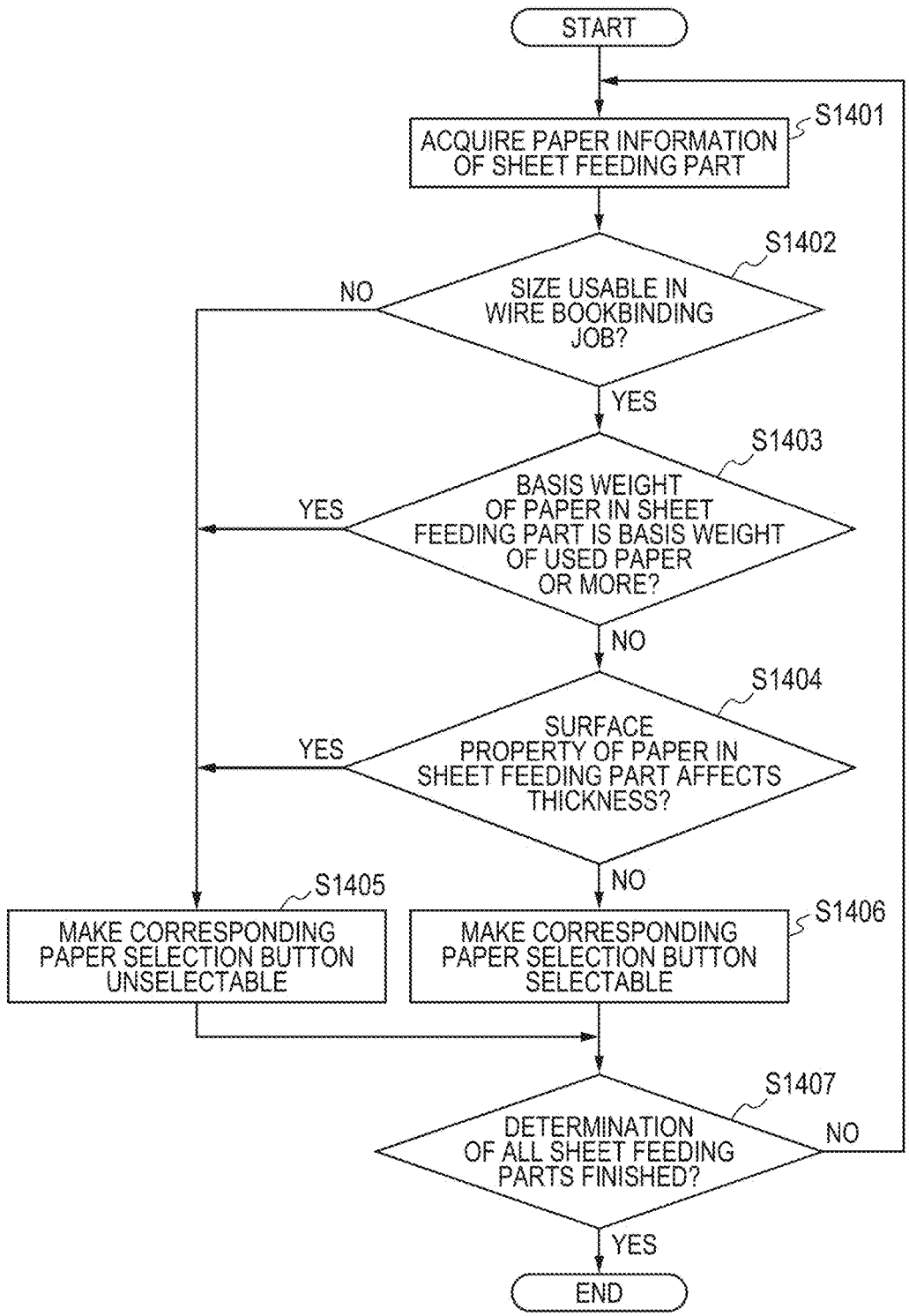
FIG. 14 is a flowchart describing a method for controlling the image forming apparatus.

FIG. 14 is a flowchart describing a method for controlling the image forming apparatus illustrating the present embodiment. The present flow is a process procedure of the control part 205 in the determination processing for the sheet feeding part. Each step is realized by the control part 205 executing a stored control program.

In S1401, the control part 205 acquires information of paper that is set in a leading sheet feeding part out of the undetermined sheet feeding parts 225. Turns of the sheet feeding parts are values set in advance, and are set based on priority levels at the time of sheet feeding or positions of the sheet feeding parts. The information on paper acquired by the control part 205 includes at least the basis weight, the surface property and the size of paper. After the control part 205 acquires the paper information, the control part 205 advances the process to S1402.

In S1402, the control part 205 determines whether the size of the paper of the sheet feeding part acquired in S1401 is the size usable in the wire bookbinding job. When the control part 205 determines that the size of the paper is the size usable in the wire bookbinding job, the control part 205 advances the process to S1403. When the control part 205 determines that the size of the paper is not the size usable in the wire bookbinding job, the control part 205 advances the process to S1405.

In S1403, the control part 205 compares the basis weight of the paper used in the job and the basis weight of the paper of the sheet feeding part that is acquired in S1401. As a result of the comparison, when the control part 205 determines that the basis weight of the paper of the sheet feeding part that is acquired is larger than or equal to that of the used paper, the control part 205 advances the process to S1405. When the control part 205 determines that the basis weight of the paper of the sheet feeding part that is acquired is smaller, the control part 205 advances the process to S1404.

In S1404, the control part 205 determines whether the surface property of the paper of the sheet feeding part that is acquired in S1401 shows presence of uneven patterns. When the control part 205 determines that the surface property shows uneven patterns, as a result of the determination, the control part 205 advances the process to S1405. When the control part 205 determines that the surface property does not show uneven patterns, the control part 205 advances the process to S1406.

In S1405, the control part 205 determines that the paper selection buttons 1202 to 1206 corresponding to the sheet feeding parts 225 are unselectable. After the control part 205 determines that the paper selection buttons 1202 to 1206 are unselectable, the control part 205 determines the sheet feeding parts as already determined, and the control part 205 advances the process to S1407. In S1406, the control part 205 determines that the paper selection buttons 1202 to 1206 corresponding to the sheet feeding parts 225 are selectable. After the control part 205 determines that the paper selection buttons are selectable, the control part 205 determines that the sheet feeding parts have been determined, and advances the process to S1407.

In S1407, the control part 205 determines whether all the sheet feeding parts 225 have been determined. When the control part 205 determines that all the sheet feeding parts 225 have been determined, the control part 205 ends the determination processing for the sheet feeding part. When the control part 205 determines that there is a sheet feeding part 225 for which determination has not been finished, the control part 205 returns the process to S1401, and repeats the aforementioned process.

According to the present embodiment, the paper replacement request screen 1200 is displayed so as to select paper that is thinner than the paper which is used, when the thickness of a paper stack exceeds the thickness that can be bound in the stacking part 415 of the bookbinding apparatus 223 in implementation of the wire bookbinding job.

Subsequently, when change to thin paper is accepted, the job is restarted with use of the selected paper. In this way, when the bookbinding job cannot be carried out, time and effort of the operator can be reduced by presenting the paper replacement work required to carry out the bookbinding job.

The present invention is realizable by a process of supplying a program realizing one or more functions of the aforementioned embodiments to a system or an apparatus via a network or a storage medium and reading the program by one or more processors in the system or the apparatus. Further, the present invention is realizable by a circuit (ASIC, for example) that realizes one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-255963, filed Dec. 28, 2016, which is hereby incorporated by reference herein in its entirety.

What is claimed is:

1. An image forming apparatus, comprising:
    a first apparatus configured to perform punching on a sheet by using a punching member;
    a second apparatus, including a stacking part on which a plurality of sheets punched by the first apparatus is stacked, and configured to perform binding so as to obtain a bookbinding article in which a binding member penetrates in a ring shape through punched holes of the plurality of sheets;
    a notification unit notifying information; and a control unit configured, in a case of starting a job using the first apparatus and the second apparatus and determining that a jam has occurred in the stacking part, to cancel the job, and to cause the notification unit to notify that a thickness of a sheet stack stacked on the stacking part exceeds a thickness that enables to be bound by the binding member used by the second apparatus.

2. The image forming apparatus according to claim 1, wherein the control unit cancels the job, after notification that the jam has occurred in the stacking part.

3. The image forming apparatus according to claim 1, wherein the control unit cancels the job, when the control unit determines that a last sheet that is to be stacked on the stacking part is not stacked yet after the jam is eliminated.

4. The image forming apparatus according to claim 1, wherein bookbinding by the second apparatus is ring bookbinding that includes stacking the sheets so that the punched holes of the sheets are mounted onto protrusions of the binding member, and thereafter, folding the binding member in a ring shape to bind the sheets.

5. The image forming apparatus according to claim 4, wherein the binding member is a material that has protruded portions of predetermined lengths continuously formed at predetermined intervals, and is capable of being processed into a ring shape by folding the protruded portions.

6. The image forming apparatus according to claim 5, wherein the binding member is a wire.

7. A method for controlling an image forming apparatus which has a notification unit notifying information, and to which a first apparatus and a second apparatus are connectable, wherein the first apparatus is configured to perform punching on a sheet by using a punching member, and the second apparatus is configured to perform binding so as to obtain a bookbinding article in which a binding member penetrates in a ring shape through punched holes of a plurality of sheets that are punched by the first apparatus, the method comprising:
controlling, in a case of starting a job using the first apparatus and the second apparatus and determining that a jam has occurred in a stacking part of the second apparatus, to cancel the job, and thereafter to cause the notification unit to notify that a thickness of a sheet stack stacked on the stacking part of the second apparatus exceeds a thickness that enables to be bound by the binding member used by the second apparatus.

8. A non-transitory computer-readable storage medium recording a program of an image forming apparatus which has a notification unit notifying information, and to which a first apparatus and a second apparatus are connectable, wherein the first apparatus is configured to perform punching on a sheet by using a punching member, and the second apparatus is configured to perform binding so as to obtain a bookbinding article in which a binding member penetrates in a ring shape through punched holes of a plurality of sheets punched by the first apparatus,
wherein the program causes a computer to function as a control unit configured, in a case of starting a job using the first apparatus and the second apparatus and determining that a jam has occurred in a stacking part of the second apparatus, to cancel the job, and thereafter to cause the notification unit to notify that a thickness of a sheet stack stacked on the stacking part of the second apparatus exceeds a thickness that enables to be bound by the binding member used by the second apparatus.

9. An image forming apparatus, comprising:
a first apparatus configured to perform punching on a sheet by using a punching member;
a second apparatus, including a stacking part on which a plurality of sheets punched by the first apparatus is stacked, and configured to perform binding so as to obtain a bookbinding article in which a first binding member penetrates in a ring shape through punched holes of the plurality of sheets;
a notification unit notifying information; and
a control unit configured, in a case of starting a job using the first apparatus and the second apparatus and determining that a jam has occurred in the stacking part, if the first binding member is replaceable with a second binding member that is capable of binding a sheet stack designated in the job, to cause the notification unit to display a screen for prompting replacement with the second binding member,
wherein the control unit restarts the job without cancelling the job in a case where the jam is eliminated and the first binding member is replaced with the second binding member, and cancels the job in a case where the jam is eliminated and the first binding member is not replaced with the second binding member.

10. An image forming apparatus according to claim 9, wherein a number of sheets that can be bookbound by the second binding member is larger than a number of sheets that can be bookbound by the first binding member.

11. The image forming apparatus according to claim 9, wherein bookbinding by the second apparatus is ring bookbinding that includes stacking the sheets so that the punched holes of the sheets are mounted onto protrusions of the first binding member or the second binding member, and thereafter, folding a corresponding binding member in a ring shape to bind the sheets.

12. The image forming apparatus according to claim 11, wherein each of the first binding member and the second binding member is a material that has protruded portions of predetermined lengths continuously formed at predetermined intervals, and is capable of being processed into a ring shape by folding the protruded portions.

13. The image forming apparatus according to claim 12, wherein each of the first binding member and the second binding member is a wire.

14. An image forming apparatus, comprising:
a first apparatus configured to perform punching on a sheet by using a punching member;
a second apparatus, including a stacking part on which a plurality of sheets punched by the first apparatus is stacked, and configured to perform binding so as to obtain a bookbinding article in which a binding member penetrates in a ring shape through punched holes of the plurality of sheets;
a notification unit notifying information; and
a control unit configured, in a case of starting a job using the first apparatus and the second apparatus and determining that a jam has occurred in the stacking part, to cause the notification unit to display a screen for prompting a replacement of a sheet to be used in the job with a thinner sheet,
wherein the control unit restarts the job without cancelling the job in a case where the jam is eliminated and the sheet to be used in the job is replaced with the thinner sheet, and cancels the job in a case where the jam is eliminated and the sheet to be used in the job is not replaced with the thinner sheet.

15. The image forming apparatus according to claim 14, wherein bookbinding by the second apparatus is ring bookbinding that includes stacking the sheets so that the punched holes of the sheets are mounted onto protrusions of the binding member, and thereafter, folding the binding member in a ring shape to bind the sheets.

16. The image forming apparatus according to claim 15, wherein the binding member is a material that has protruded portions of predetermined lengths continuously formed at predetermined intervals, and is capable of being processed into a ring shape by folding the protruded portions.

17. The image forming apparatus according to claim 16, wherein the binding member is a wire.

\* \* \* \* \*